(12) United States Patent
Chen et al.

(10) Patent No.: US 12,548,536 B2
(45) Date of Patent: Feb. 10, 2026

(54) IMAGE PROCESSING METHOD BASED ON VERTICAL SYCHRONIZATION SIGNAL AND ELECTRONIC DEVICE

(71) Applicant: Huawei Technologies Co., Ltd., Shenzhen (CN)

(72) Inventors: Jian Chen, Shanghai (CN); Tanqi Yu, Shanghai (CN); Yu Li, Shanghai (CN); Liang Wang, Shanghai (CN); Xingchun Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 329 days.

(21) Appl. No.: 18/247,244

(22) PCT Filed: Aug. 30, 2021

(86) PCT No.: PCT/CN2021/115454
§ 371 (c)(1),
(2) Date: Mar. 29, 2023

(87) PCT Pub. No.: WO2022/068501
PCT Pub. Date: Apr. 7, 2022

(65) Prior Publication Data
US 2024/0021176 A1    Jan. 18, 2024

(30) Foreign Application Priority Data

Sep. 30, 2020 (CN) .......................... 202011062586.6

(51) Int. Cl.
*G09G 5/377* (2006.01)
(52) U.S. Cl.
CPC ..... *G09G 5/377* (2013.01); *G09G 2340/0435* (2013.01)
(58) Field of Classification Search
CPC ................................................. G09G 5/377
See application file for complete search history.

(56) References Cited

U.S. PATENT DOCUMENTS

2016/0247484 A1* 8/2016 Chen .................... G06T 1/20
2018/0261140 A1* 9/2018 Yi ....................... G09G 3/2003
2019/0005702 A1* 1/2019 Takimoto ............... G09G 5/026

FOREIGN PATENT DOCUMENTS

| CN | 106843859 A | 6/2017 |
| CN | 110502294 A | 11/2019 |
| CN | 110503708 A | 11/2019 |
| CN | 110609645 A | 12/2019 |

* cited by examiner

*Primary Examiner* — Michelle L Sams
(74) *Attorney, Agent, or Firm* — Slater Matsil, LLP

(57) ABSTRACT

An image processing method based on a vertical synchronization signal and an electronic device, related to the field of image processing and display technologies. The method includes that the electronic device draws one or more layers in response to a first vertical synchronization signal; and the electronic device renders, in response to a second vertical synchronization signal, the layers drawn by the electronic device.

16 Claims, 17 Drawing Sheets

IMAGE PROCESSING METHOD BASED ON VERTICAL SYCHRONIZATION SIGNAL AND ELECTRONIC DEVICE

CROSS-REFERENCE TO RELATED APPLICATIONS

This application is a National Stage of International Application No. PCT/CN2021/115454, filed on Aug. 30, 2021, which claims priority to Chinese Patent Application No. 202011062586.6, filed on Sep. 30, 2020, both of which are hereby incorporated by reference in their entireties.

TECHNICAL FIELD

Embodiments of this application relate to the field of image processing and display technologies, and in particular, to an image processing method based on a vertical synchronization signal and an electronic device.

BACKGROUND

With development of electronic technologies, performance of various electronic devices (such as mobile phones) becomes better. Consumers have increasingly high requirements on man-machine interaction performance of electronic products. Visual coherence, for a user, of display content of an electronic device is important man-machine interaction performance.

High frame rate display of the electronic device is also a development trend. For example, a frame rate of the electronic device increases from 60 hertz (Hz) to 90 Hz, and then to 120 Hz. However, a higher frame rate of the electronic device indicates a higher possibility of a frame loss. Consequently, display content of the electronic device is discontinuous, and user experience is affected. Therefore, how to reduce or even avoid a frame loss when an electronic device displays an image in a high frame rate scenario is an urgent problem to be resolved.

SUMMARY

Embodiments of this application provide an image processing method based on a vertical synchronization signal and an electronic device, to decrease a possibility that a frame loss occurs when the electronic device displays an image, and ensure smoothness of displaying an image on a display, thereby improving visual experience of a user.

According to a first aspect, this application provides an image processing method based on a vertical synchronization signal. The method may include: An electronic device draws one or more layers in response to a first vertical synchronization signal. The electronic device renders, in response to a second vertical synchronization signal, the layers drawn by the electronic device.

For example, the first vertical synchronization signal may be a VSYNC_APP signal, and the second vertical synchronization signal may be a VSYNC_Render signal.

Usually, the electronic device (such as a render thread of the electronic device) performs layer rendering on the one or more layers after the electronic device (such as a UI thread of the electronic device) draws the one or more layers. The UI thread periodically draws the layers based on the VSYNC_APP signal. To be specific, the UI thread and the render thread draw and render the layers based on one stage of pipeline, namely, the VSYNC_APP signal. In this way, there is a relatively high possibility that a frame loss occurs when an image is displayed on a display of the electronic device.

However, in this application, the UI thread and the render thread are not required to complete drawing and rendering of each frame of layer within one synchronization period. Specifically, in this embodiment of this application, one stage of pipeline (such as a VSYNC_Render signal) may be added for the render thread of the electronic device. Instead of rendering a layer immediately after the UI thread has completed drawing of a layer, the render thread renders the layer in response to the VSYNC_Render signal.

In this way, as long as the UI thread may complete the drawing of each frame of layer within one synchronization period$_2$ in response to the VSYNC_APP signal, and the render thread may complete the rendering of each frame of layer within one synchronization period in response to the VSYNC_Render signal, a frame loss does not occur when an image is displayed on the display of the electronic device. According to the method in this application, a possibility that a frame loss occurs when the electronic device displays an image can be decreased, and smoothness of displaying an image on the display can be ensured, thereby improving visual experience of a user.

In a possible design manner of the first aspect, if the electronic device meets at least one of the following preset conditions, the electronic device may render the one or more layers in response to the second vertical synchronization signal. The preset conditions include: a screen refresh rate of the electronic device is greater than a preset refresh rate threshold; a current application of the electronic device is a preset application, and the preset application does not include a game application; and a first processing frame length of the electronic device in a first statistics collecting period is greater than a preset single-frame frame length.

The first processing frame length is a sum of a first drawing frame length and a first rendering frame length, the first drawing frame length is duration required by the electronic device to draw a layer, and the first rendering frame length is duration required by the electronic device to render a layer.

In one aspect, if the screen refresh rate of the electronic device is greater than the preset refresh rate threshold, it indicates that the electronic device is in a high frame rate scenario. In the high frame rate scenario, there is a high possibility that a frame loss occurs when the electronic device displays an image. Therefore, in the high frame rate scenario, the electronic device may perform the method, to decrease the possibility that a frame loss occurs when the electronic device displays an image, and ensure smoothness of displaying an image on the display.

In another aspect, if the current application of the electronic device is not a game application, it indicates that the electronic device is in a non-game scenario. Usually, in the non-game scenario, the electronic device has a relatively low requirement on a latency. According to the foregoing method, although the possibility that a frame loss occurs when the electronic device displays an image can be decreased, a response latency of the electronic device from drawing a frame of layer to refreshing and displaying an image frame corresponding to the layer is also prolonged. Therefore, in the non-game scenario, the electronic device may perform the method, to decrease the possibility that a frame loss occurs when the electronic device displays an image, and ensure smoothness of displaying an image on the display.

In still another aspect, if the first processing frame length of the electronic device in the first statistics collecting period is greater than the preset single-frame frame length, it indicates that there is a relatively high possibility that a frame loss occurs when the electronic device displays an image. In this case, the electronic device may perform the method, to decrease the possibility that a frame loss occurs when the electronic device displays an image, and ensure smoothness of displaying an image on the display.

In another possible design manner of the first aspect, the second vertical synchronization signal (such as the VSYNC_Render signal) has the same frequency as the first vertical synchronization signal (such as the VSYNC_APP signal).

In another possible design manner of the first aspect, even if one stage of pipeline, namely, the VSYNC_Render signal, is added, if duration required by the UI thread of the electronic device to draw a layer is relatively large, a frame loss still occurs when the electronic device displays an image. To reduce the possibility that a frame loss occurs when an image is displayed on the display of the electronic device, the electronic device may adjust the VSYNC_Render signal, so that the VSYNC_Render signal is delayed by first delay duration compared with the VSYNC_APP signal. In this way, a possibility that the UI thread completes a layer drawing task within one synchronization period can be increased.

Specifically, after the electronic device renders the one or more layers in response to the second vertical synchronization signal, the method in this application may further include: The electronic device adjusts the second vertical synchronization signal, so that the second vertical synchronization signal (such as the VSYNC_Render signal) is delayed by the first delay duration compared with the first vertical synchronization signal (such as the VSYNC_APP signal). Then, the electronic device may render, in response to the adjusted second vertical synchronization signal (such as the VSYNC_Render signal), the layers drawn by the electronic device.

In another possible design manner of the first aspect, that the electronic device adjusts the second vertical synchronization signal, so that the second vertical synchronization signal is delayed by the first delay duration compared with the first vertical synchronization signal may include: If a second drawing frame length of a second statistics collecting period is greater than preset single-frame duration, the electronic device adjusts the second vertical synchronization signal, so that the second vertical synchronization signal is delayed by the first delay duration compared with the first vertical synchronization signal. The first delay duration is greater than or equal to a difference between the second drawing frame length and the preset single-frame duration.

If the second drawing frame length of the second statistics collecting period is greater than the preset single-frame duration, it indicates that a possibility that the UI thread completes a layer drawing task within one synchronization period is relatively low, and a possibility that a frame loss occurs when the electronic device displays an image is relatively high. In this case, the electronic device adjusts the second vertical synchronization signal, so that the second vertical synchronization signal is delayed by the first delay duration compared with the first vertical synchronization signal, and then renders, in response to the adjusted second vertical synchronization signal, the layers drawn by the electronic device, thereby improving the possibility that the UI thread completes the layer drawing task within the synchronization period. Therefore, a possibility that a frame loss occurs when the electronic device displays an image can be decreased, and smoothness of displaying an image on the display can be ensured.

In another possible design manner of the first aspect, even if one stage of pipeline, namely, the VSYNC_Render signal, is added, if duration required by the render thread of the electronic device to render a layer is relatively large, a frame loss still occurs when the electronic device displays an image. To reduce the possibility that a frame loss occurs when an image is displayed on the display of the electronic device, the electronic device may adjust the VSYNC_Render signal, so that the VSYNC_Render signal is advanced by the second delay duration compared with the VSYNC_APP signal. In this way, a possibility that the render thread completes a layer drawing task within one synchronization period can be increased.

Specifically, after the electronic device renders the one or more layers in response to the second vertical synchronization signal, the method in this application further includes: The electronic device adjusts the second vertical synchronization signal, so that the first vertical synchronization signal is advanced by the second delay duration compared with the second vertical synchronization signal. The electronic device renders, in response to the adjusted second vertical synchronization signal, the layers drawn by the electronic device.

In another possible design manner of the first aspect, that the electronic device adjusts the second vertical synchronization signal, so that the second vertical synchronization signal is delayed by the first delay duration compared with the first vertical synchronization signal may include: If a second drawing frame length of a second statistics collecting period is less than preset single-frame duration, and second rendering duration of the second statistics collecting period is greater than the preset single-frame duration, the electronic device adjusts the second vertical synchronization signal, so that the first vertical synchronization signal is advanced by second delay duration compared with the second vertical synchronization signal. The second delay duration is greater than or equal to a difference between the preset single-frame duration and the second drawing frame length.

If the second drawing frame length of the second statistics collecting period is less than the preset single-frame duration, it indicates that a possibility that the UI thread completes a layer drawing task within one synchronization period is relatively high. In this case, to decrease a possibility that the render thread completes a layer rendering task within one synchronization period, the electronic device may adjust the second vertical synchronization signal, so that the first vertical synchronization signal is advanced by the second delay duration compared with the second vertical synchronization signal, and then renders, in response to the adjusted second vertical synchronization signal, the layers drawn by the electronic device, thereby improving the possibility that the render thread completes the layer rendering task within the synchronization period. Therefore, a possibility that a frame loss occurs when the electronic device displays an image can be decreased, and smoothness of displaying an image on the display can be ensured.

According to a second aspect, this application provides an image processing method based on a vertical synchronization signal. The method may include: An electronic device draws one or more layers in response to a first vertical synchronization signal, and renders the one or more layers. If the electronic device completes the rendering of the one or more layers within preset single-frame duration, the electronic device performs layer composition on the one or more layers in response to the $2^{nd}$ second vertical synchronization signal after the rendering of the one or more layers is completed. If the electronic device has not completed the rendering of the one or more layers within the preset single-frame duration, the electronic device performs layer composition on the one or more layers in response to the $1^{st}$ second vertical synchronization signal after the rendering of the one or more layers is completed, to obtain an image frame.

According to solutions of this application, for a layer on which drawing and rendering are completed within one frame, the electronic device may perform layer composition on the layer one frame later. In this way, an image frame corresponding to the layer may be displayed one frame later. In this way, even if there is subsequently a case in which the electronic device cannot complete drawing and rendering within one frame, a buffer time of one frame (namely, one synchronization period) may be reserved, so that a possibility that a frame loss occurs when the electronic device displays an image can be decreased, and smoothness of displaying an image on a display can be ensured.

In a possible design manner of the first aspect, if the electronic device meets at least one of the following preset conditions, the electronic device may render the one or more layers in response to the second vertical synchronization signal. The preset conditions include: a screen refresh rate of the electronic device is greater than a preset refresh rate threshold; a current application of the electronic device is a preset application, and the preset application does not include a game application; and a first processing frame length of the electronic device in a first statistics collecting period is greater than a preset single-frame frame length.

The first processing frame length is a sum of a first drawing frame length and a first rendering frame length, the first drawing frame length is duration required by the electronic device to draw a layer, and the first rendering frame length is duration required by the electronic device to render a layer.

In one aspect, if the screen refresh rate of the electronic device is greater than the preset refresh rate threshold, it indicates that the electronic device is in a high frame rate scenario. In the high frame rate scenario, there is a high possibility that a frame loss occurs when the electronic device displays an image. Therefore, in the high frame rate scenario, the electronic device may perform the method, to decrease the possibility that a frame loss occurs when the electronic device displays an image, and ensure smoothness of displaying an image on the display.

In another aspect, if the current application of the electronic device is not a game application, it indicates that the electronic device is in a non-game scenario. Usually, in the non-game scenario, the electronic device has a relatively low requirement on a latency. According to the foregoing method, although the possibility that a frame loss occurs when the electronic device displays an image can be decreased, a response latency of the electronic device from drawing a frame of layer to refreshing and displaying an image frame corresponding to the layer is also prolonged. Therefore, in the non-game scenario, the electronic device may perform the method, to decrease the possibility that a frame loss occurs when the electronic device displays an image, and ensure smoothness of displaying an image on the display.

In still another aspect, if the first processing frame length of the electronic device in the first statistics collecting period is greater than the preset single-frame frame length, it indicates that there is a relatively high possibility that a frame loss occurs when the electronic device displays an image. In this case, the electronic device may perform the method, to decrease the possibility that a frame loss occurs when the electronic device displays an image, and ensure smoothness of displaying an image on the display.

According to a third aspect, this application provides an electronic device. The electronic device includes a display, a memory, and one or more processors. The display, the memory, and the processor are coupled. The memory is configured to store computer program code, and the computer program code includes computer instructions. When the processor executes the computer instructions, the electronic device performs the method according to any one of the first aspect or the second aspect and the possible design manners of the first aspect or the second aspect.

According to a fourth aspect, this application provides a chip system. The chip system is applied to an electronic device including a display. The chip system includes one or more interface circuits and one or more processors. The interface circuits and the processors are interconnected by using a line. The interface circuit is configured to: receive a signal from a memory of the electronic device, and send a signal to the processor, where the signal includes computer instructions stored in the memory. When the processor executes the computer instructions, the electronic device performs the method according to any one of the first aspect or the second aspect and the possible design manners of the first aspect or the second aspect.

According to a fifth aspect, this application provides a computer storage medium. The computer storage medium includes computer instructions. When the computer instructions run on an electronic device, the electronic device is enabled to perform the method according to any one of the first aspect or the second aspect and the possible design manners of the first aspect or the second aspect.

According to a sixth aspect, this application provides a computer program product. When the computer program product runs on a computer, the computer is enabled to perform the method according to any one of the first aspect or the second aspect and the possible design manners of the first aspect or the second aspect.

It may be understood that for beneficial effects that can be achieved by the electronic device according to the third aspect, the chip system according to the fourth aspect, the computer storage medium according to the fifth aspect, and the computer program product according to the sixth aspect that are provided above, refer to the beneficial effects of any one of the first aspect or the second aspect and the possible design manners of the first aspect or the second aspect. Details are not described herein again.

DETAILED DESCRIPTION OF ILLUSTRATIVE EMBODIMENTS

The terms "first" and "second" mentioned below are merely intended for a purpose of description, and shall not be understood as an indication or implication of relative importance or implicit indication of the number of indicated technical features. Therefore, a feature limited by "first" or "second" may explicitly indicate or implicitly include one or more such features. In the description of the embodiments, unless otherwise stated, "a plurality of" means two or more than two.

The embodiments of this application provide an image processing method based on a vertical synchronization signal. The method may be applied to an electronic device including a display (such as a touchscreen). According to the method, a possibility that a frame loss occurs when the electronic device displays an image can be decreased, and smoothness of displaying an image on the display can be ensured, thereby improving visual experience of a user.

For example, the electronic device may be a device that includes a display (such as a touchscreen), for example, a mobile phone, a tablet computer, a desktop computer, a laptop computer, a handheld computer, a notebook computer, or an ultra-mobile personal computer (ultra-mobile personal computer, UMPC), a netbook, and a cellular phone, or a personal digital assistant (personal digital assistant, PDA), or an augmented reality (augmented reality, AR) device or a virtual reality (virtual reality, VR) device. A specific form of the electronic device is not specially limited in embodiments of this application.

The following describes implementations of embodiments of this application in detail with reference to the accompanying drawings.

Figure 1:
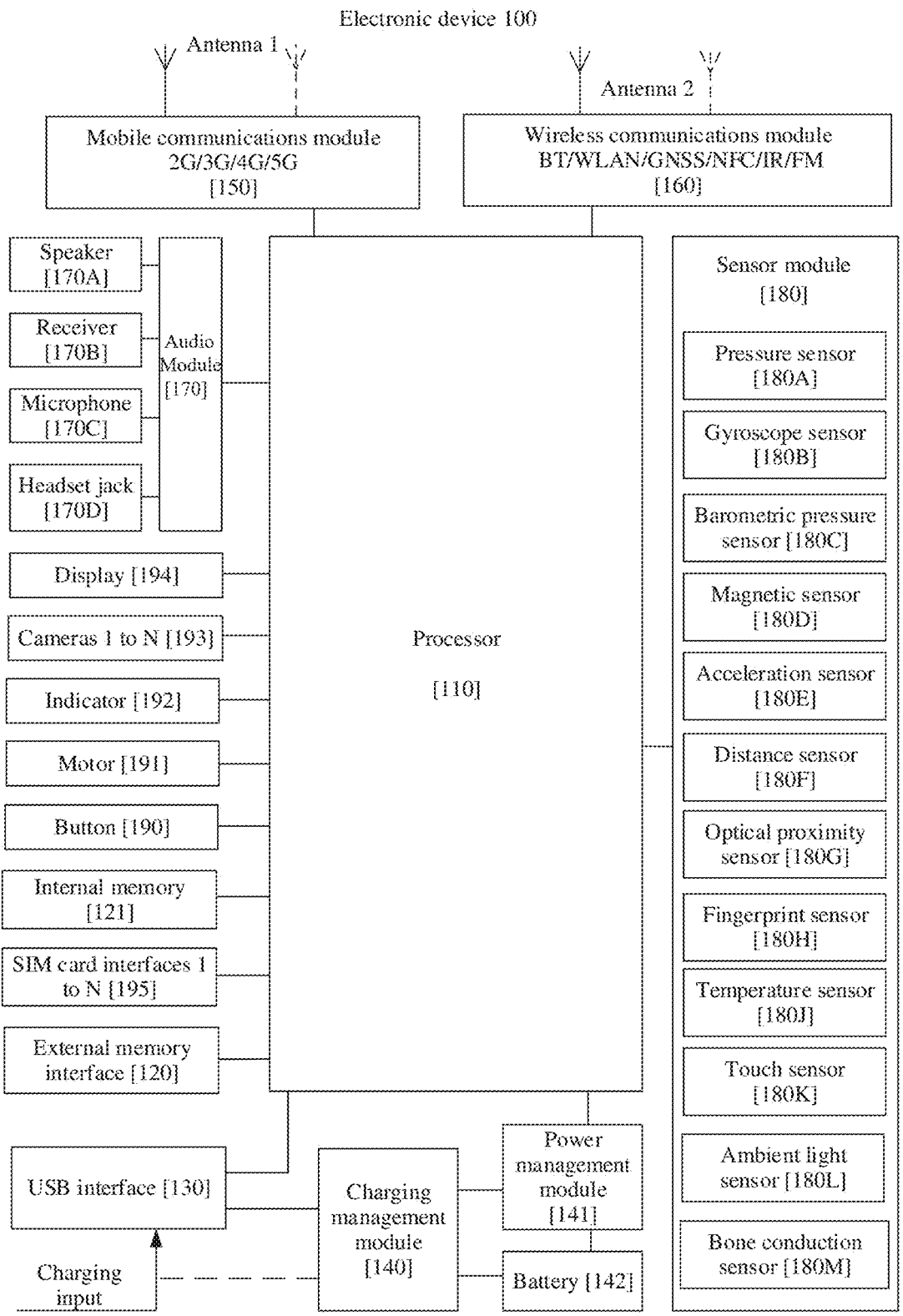
FIG. 1 is a schematic diagram of a structure of hardware of an electronic device according to an embodiment of this application.

FIG. 1 is a schematic diagram of a structure of an electronic device 100 according to an embodiment of this application. As shown in FIG. 1, the electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a key 190, a motor 191, an indicator 192, a camera 293, a display 194, a subscriber identity module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment does not constitute a specific limitation on the electronic device 100. In some other embodiments, the electronic device 100 may include more or fewer components than those shown in the figure, or some components may be combined, or some components may be split, or different component arrangements may be used. The components shown in the figure may be implemented by using hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent devices, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache.

The memory may store instructions or data that has been used or is cyclically used by the processor 110. If the processor 110 needs to use the instructions or the data again, the processor may directly invoke the instructions or the data from the memory. This avoids repeated access, reduces a waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

It may be understood that an interface connection relationship between the modules that is shown in this embodiment is merely an example for description, and does not constitute a limitation on a structure of the electronic device 100. In some other embodiments, the electronic device 100 may alternatively use an interface connection manner different from that in the foregoing embodiment, or use a combination of a plurality of interface connection manners.

The charging management module 140 is configured to receive charging input from a charger. The charging management module 140 may further supply power to the electronic device by using the power management module 141 while charging the battery 142.

The power management module 141 is configured to connect the battery 142, the charging management module 140, and the processor 110. The power management module 141 receives an input of the battery 142 and/or the charging management module 140, and supplies power to the processor 110, the internal memory 121, an external memory, the display 194, the camera 293, the wireless communications module 160, and the like. In some other embodiments, the power management module 141 may be alternatively disposed in the processor 110. In some other embodiments, the power management module 141 and the charging management module 140 may be alternatively disposed in the same component.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna in a wireless local area network.

The mobile communications module 150 may provide a wireless communication solution such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (which is not limited to the speaker 170A, the receiver 170B, and the like), or displays an image or a video on the display 194.

The wireless communications module 160 may provide a wireless communication solution that is applied to the electronic device 100, and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components into which at least one communications processor module is integrated. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation system, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric calculation, and perform graphics rendering. The processor 110 may include one or more GPUs that execute program instructions to generate or change display information.

The display 194 is configured to display an image, a video, or the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a Mini-LED, a Micro-LED, a Micro-OLED, a quantum dot light emitting diode (quantum dot light emitting diode, QLED), or the like.

The display 194 in this embodiment of this application may be a touchscreen. To be specific, the touch sensor 180K is integrated into the display 194. The touch sensor 180K may also be referred to as a "touch control panel". In other words, the display 194 may include a display panel and a touch panel, and the touch sensor 180K and the display 194 constitute a touchscreen, which is also referred to as a "touch control screen". The touch sensor 180K is configured to detect a touch operation performed on or near the touch sensor. After detecting a touch operation, the touch sensor 180K may transfer the touch operation to an upper layer by a driver (such as a TP driver) of a kernel layer, to determine a touch event type. A visual output related to the touch operation may be provided through the display 194. In some other embodiments, the touch sensor 180K may be alternatively disposed on a surface of the electronic device 100 at a location different from a location of the display 194.

The electronic device 100 can implement a photographing function by using the ISP, the camera 293, the video codec, the GPU, the display 194, the application processor, and the like. The ISP is configured to process data fed back by the camera 293. The camera 293 is configured to capture a static image or a video. The digital signal processor is configured to process a digital signal, and may process another digital signal in addition to a digital image signal. The video codec is configured to: compress or decompress a digital video. The electronic device 100 may support one or more types of video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, a transfer mode between human brain neurons, and may further continuously perform self-learning. Applications such as intelligent cognition of the electronic device 100, for example, image recognition, facial recognition, speech recognition, and text understanding, may be implemented through the NPU.

The external memory interface 120 may be configured to connect to an external storage card, for example, a micro SD card, to extend a storage capability of the electronic device 100. The external storage card communicates with the processor 110 through the external memory interface 120, to implement a data storage function. For example, files such as music and a video are stored in the external storage card. The internal memory 121 may be configured to store computer-executable program code. The executable program code includes instructions. The processor 110 implements various function applications and data processing of the electronic device 100 by running the instructions stored in the internal memory 121. For example, in this embodiment of this application, the processor 110 may execute the instructions stored in the internal memory 121. The internal memory 121 may include a program storage area and a data storage area. The program storage area may store an operating system, an application required by at least one function (for example, a voice playing function or an image playing function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to: encode and decode an audio signal. The speaker 170A, also referred to as a "loudspeaker", is configured to convert an audio electrical signal into a sound signal. The receiver 170B, also referred to as an "earpiece", is configured to convert an audio electrical signal into a sound signal. The microphone 170C, also referred to as a "mike" or a "mic", is configured to convert a sound signal into an electrical signal. The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation through the pressure sensor 180A. The electronic device 100 may further calculate a touch location based on a detection signal of the pressure sensor 180A. In some embodiments, touch operations that are performed at a same touch location but have different touch operation intensity may correspond to different operation instructions. In this embodiment of this application, the electronic device 100 may obtain a pressing force of a touch operation of a user by using the pressure sensor 180A.

The button 190 includes a power button, a volume button, and the like. The button 190 may be a mechanical button, or may be a touch button. The electronic device 100 may receive a button input, and generate a button signal input related to user settings and function control of the electronic device 100. The motor 191 may generate a vibration prompt. The motor 191 may be configured to produce an incoming call vibration prompt and a touch vibration feedback. The indicator 192 may be an indicator light, and may be configured to indicate a charging status and a power change, or may be configured to indicate a message, a missed call, a notification, and the like. The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like.

For ease of understanding, in this embodiment of this application, a vertical synchronization signal described in a conventional technology is described herein, for example, a vertical synchronization signal 1, a vertical synchronization signal 2, and a vertical synchronization signal 3.

Vertical synchronization signal 1: such as VSYNC_APP. The vertical synchronization signal 1 may be used to trigger drawing of one or more layers, and render the drawn layers. To be specific, the vertical synchronization signal 1 may be used to trigger a UI thread to draw the one or more layers, and a render thread renders the one or more layers drawn by the UI thread.

Vertical synchronization signal 2: such as VSYNC_SF. The vertical synchronization signal 2 may be used to trigger layer composition to be performed on the one or more rendered layers, to obtain an image frame. To be specific, the vertical synchronization signal 2 may be used to trigger a composition thread to perform the layer composition on the one or more layers rendered by the render thread, to obtain the image frame.

Vertical synchronization signal 3: such as HW_VSYNC. The vertical synchronization signal 3 may be used to trigger hardware to refresh and display the image frame.

The vertical synchronization signal 3 is a hardware signal triggered by a display driver of the electronic device. In this embodiment of this application, a signal period T3 of the vertical synchronization signal 3 (such as HW_VSYNC) is determined based on a screen refresh rate of the display of the electronic device. Specifically, the signal period T3 of the vertical synchronization signal 3 is a reciprocal of the screen refresh rate of the display (such as an LCD or an OLED) of the electronic device. The screen refresh rate of the electronic device may be the same as a frame rate of the electronic device. A high frame rate of the electronic device is a high screen refresh rate.

For example, the screen refresh rate and the frame rate of the display of the electronic device may be any value such as 60 hertz (Hz), 70 Hz, 75 Hz, 80 Hz, 90 Hz, or 120 Hz. For example, the frame rate is 60 Hz, and the signal period of the vertical synchronization signal 3 is 1/60=0.01667 second (s)=16.667 milliseconds (ms). For example, the frame rate is 90 Hz, and the signal period of the vertical synchronization signal 3 is 1/90=0.01111 second (s)=11.11 milliseconds (ms). It should be noted that the electronic device may support a plurality of different frame rates. The frame rate of the electronic device may be switched between the foregoing different frame rates. The frame rate described in this embodiment of this application is a frame rate currently used by the electronic device. In other words, the signal period of the vertical synchronization signal 3 is a reciprocal of the frame rate currently used by the electronic device.

Figure 2:
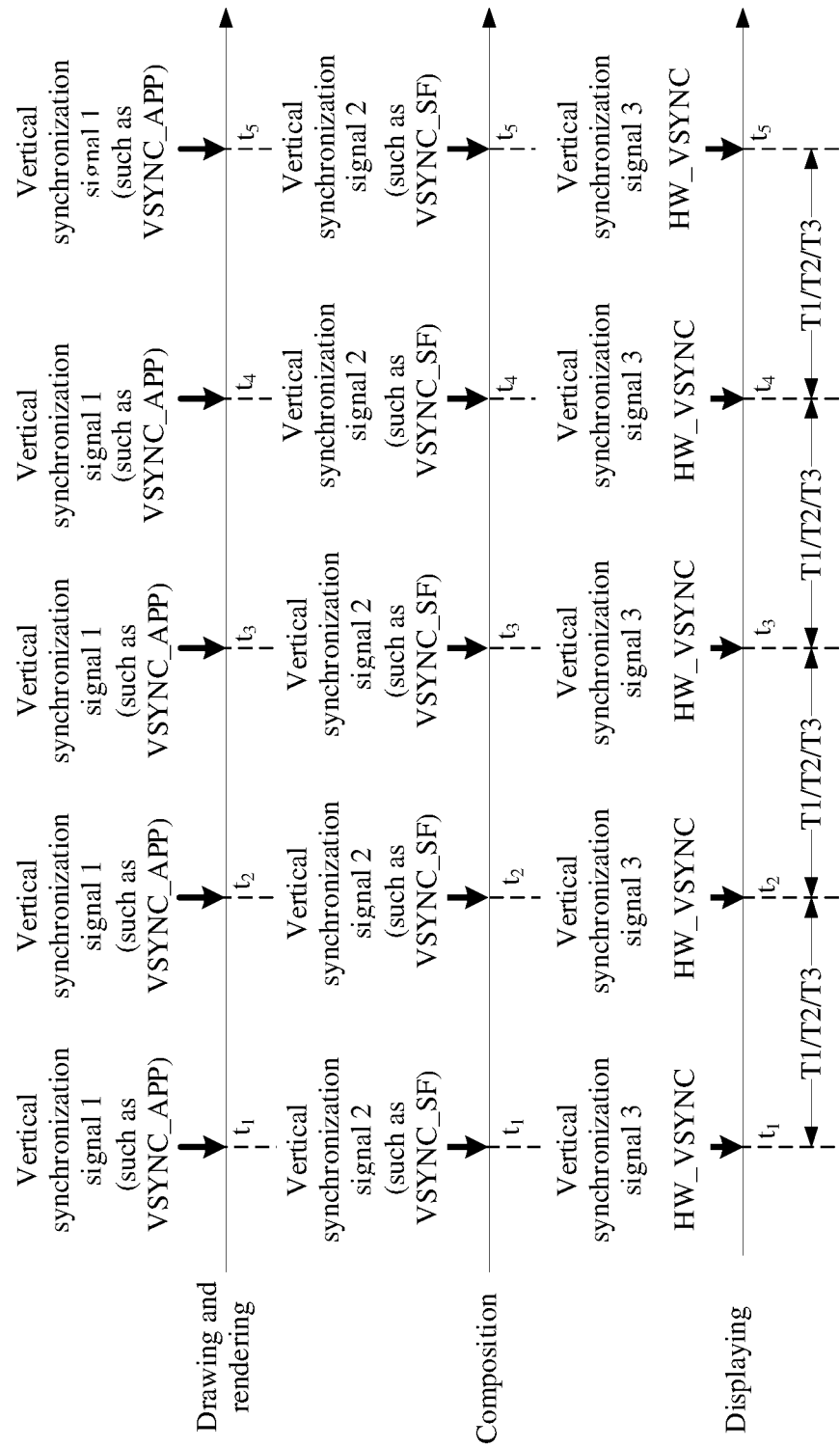
FIG. 2 is a schematic diagram of a vertical synchronization signal according to an embodiment of this application.

It should be noted that the vertical synchronization signal 3 in this embodiment of this application is a periodic discrete signal. For example, as shown in FIG. 2, there is one vertical synchronization signal 3 triggered by a hardware driver every one signal period. A vertical synchronization signal 1 and a vertical synchronization signal 2 are generated based on a vertical synchronization signal 3. In other words, the vertical synchronization signal 3 may be a signal source of the vertical synchronization signal 1 and the vertical synchronization signal 2. Alternatively, the vertical synchronization signal 1 and the vertical synchronization signal 2 are synchronized with the vertical synchronization signal 3. Therefore, the vertical synchronization signal 1 and the vertical synchronization signal 2 have signal periods the same as that of the vertical synchronization signal 3, and have phases the same as that of the vertical synchronization signal 3. For example, as shown in FIG. 2, a signal period T1 of a vertical synchronization signal 1 and a signal period T2 of a vertical synchronization signal 2 are the same as a signal period T3 of a vertical synchronization signal 3. In addition, as shown in FIG. 2, the vertical synchronization signal 1 and the vertical synchronization signal 2 have phases the same as that of the vertical synchronization signal 3. It may be understood that, in an actual implementation process, a phase error may exist between the vertical synchronization signal 1, the vertical synchronization signal 2, and the vertical synchronization signal 3 due to various factors (such as processing performance). It should be noted that when the method in this embodiment of this application is understood, the phase error is ignored.

In conclusion, the vertical synchronization signal 1, the vertical synchronization signal 2, and the vertical synchronization signal 3 are all periodic discrete signals. For example, as shown in FIG. 2, there is one vertical synchronization signal 1 every one signal period, there is one vertical synchronization signal 2 every one signal period, and there is one vertical synchronization signal 3 every one signal period. Each of the signal periods of the vertical synchronization signal 1, the vertical synchronization signal 2, and the vertical synchronization signal 3 may be referred to as a synchronization period $T_z$, and $T1=T2=T3=T_z$. In other words, the synchronization period in this embodiment of this application is a reciprocal of the frame rate of the electronic device.

It should be noted that names of vertical synchronization signals may be different in different systems or architectures. For example, in some systems or architectures, a name of the foregoing vertical synchronization signal (namely, the vertical synchronization signal 1) used to trigger the drawing of the one or more layers may not be VSYNC_APP. However, regardless of a name of the vertical synchronization signal, any synchronization signal that has a similar function and complies with the technical idea of the method provided in embodiments of this application shall fall within the protection scope of this application.

Figure 3:
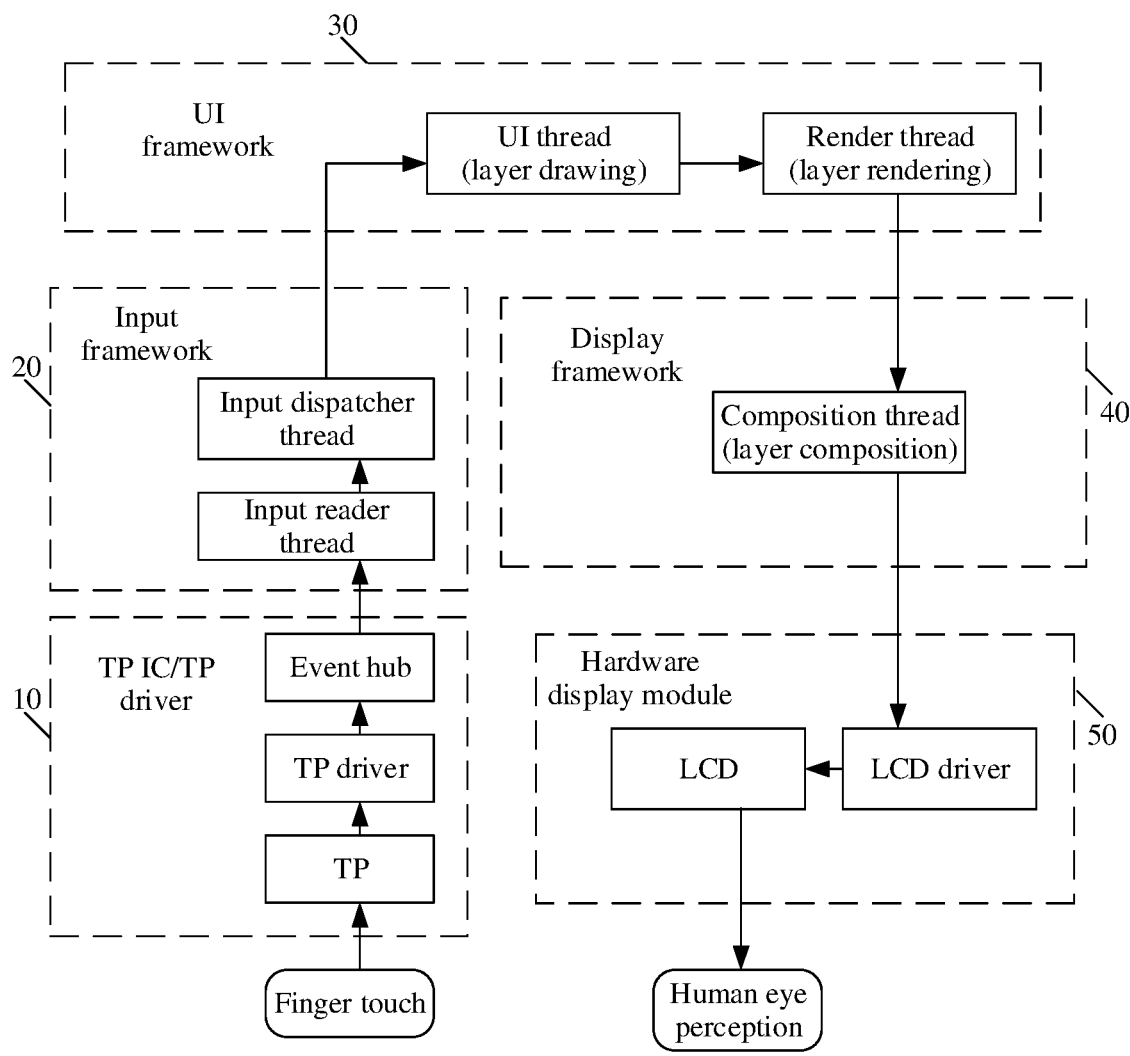
FIG. 3 is a schematic diagram of a software processing procedure in which an electronic device displays an image in response to a touch operation according to an embodiment of this application.

For ease of understanding, in this embodiment of this application, with reference to FIG. 3, an example in which the display is a touchscreen and an operation performed by the user on the display is a touch operation is used to describe a software processing procedure of the electronic device in a process from "inputting a touch operation by a finger of the user on the touchscreen" to "displaying an image corresponding to the touch operation on the touchscreen".

As shown in FIG. 3, the electronic device may include a touch control panel (touch panel, TP)/TP driver (Driver) 10, an input framework (Input Framework) 20, a UI framework (namely, UI Framework) 30, a display framework (namely, Display Framework) 40, and a hardware display module 50.

As shown in FIG. 3, the software processing procedure of the electronic device may include steps (1) to (5) below. Step (1): After a TP in the TP IC/TP driver 10 collects a touch operation performed by the finger of the user on the TP of the electronic device, the TP driver reports a corresponding touch event to an event hub. Step (2): An input reader thread of the input framework 20 may read a touch event from the event hub, and then send the touch event to an input dispatcher thread; and the input dispatcher thread uploads the touch event to a UI thread of the UI framework 30. Step (3): The UI thread (such as Do Frame) of the UI framework 30 draws one or more layers corresponding to the touch event; and a render (Render) thread (such as Draw Frame) performs layer rendering on one or more layers. Step (4): A composition thread (Surface Flinger) of the display framework 40 performs layer composition on the one or more drawn layers (namely, the one or more rendered layers) to obtain an image frame. Step (5): A liquid crystal display panel (Liquid Crystal Display, LCD) driver of the hardware display module 50 may receive the composed image frame, and the LCD displays the composed image frame. After the LCD displays the image frame, an image displayed by the LCD may be perceived by human eyes.

Usually, in response to a touch operation performed by the user on the TP or a UI event, after a vertical synchronization signal 1 arrives, the UI framework may invoke the UI thread to draw one or more layers corresponding to a touch control event, and then invoke the render thread to render the one or more layers. Then, after a vertical synchronization signal 2 arrives, a hardware composer (Hardware Composer, HWC) may invoke the composition thread to perform layer composition on the one or more drawn layers (namely, the one or more rendered layers) to obtain an image frame. Finally, the hardware display module may refresh and display the image frame on the LCD after a vertical synchronization signal 3 arrives. The UI event may be triggered by the touch operation performed by the user on the TP. Alternatively, the UI event may be automatically triggered by the electronic device. For example, when a foreground application of the electronic device automatically switches a picture, the UI event may be triggered. The foreground application is an application corresponding to a screen currently displayed on the display of the electronic device.

The TP may periodically detect a touch operation of the user. After detecting the touch operation, the TP may wake up the vertical synchronization signal 1 and the vertical synchronization signal 2, to trigger the UI framework to perform layer drawing and rendering based on the vertical synchronization signal 1, and the hardware composer HWC performs layer composition based on the vertical synchronization signal 2. A detection period in which the TP detects the touch operation is the same as a signal period T3 of the vertical synchronization signal 3 (such as HW_VSYNC).

It should be noted that the UI framework periodically performs layer drawing and rendering based on the vertical synchronization signal 1; the hardware composer HWC periodically performs layer composition based on the vertical synchronization signal 2; and the LCD periodically performs image frame refreshing based on the vertical synchronization signal 3.

For example, in this embodiment of this application, an example in which the vertical synchronization signal 1 is a VSYNC_APP signal, the vertical synchronization signal 2 is a VSYNC_SF signal, and the vertical synchronization signal 3 is an HW_VSYNC signal is used to describe a procedure in which an electronic device performs drawing, rendering, composition, and image frame displaying in a conventional technology.

Figure 4:
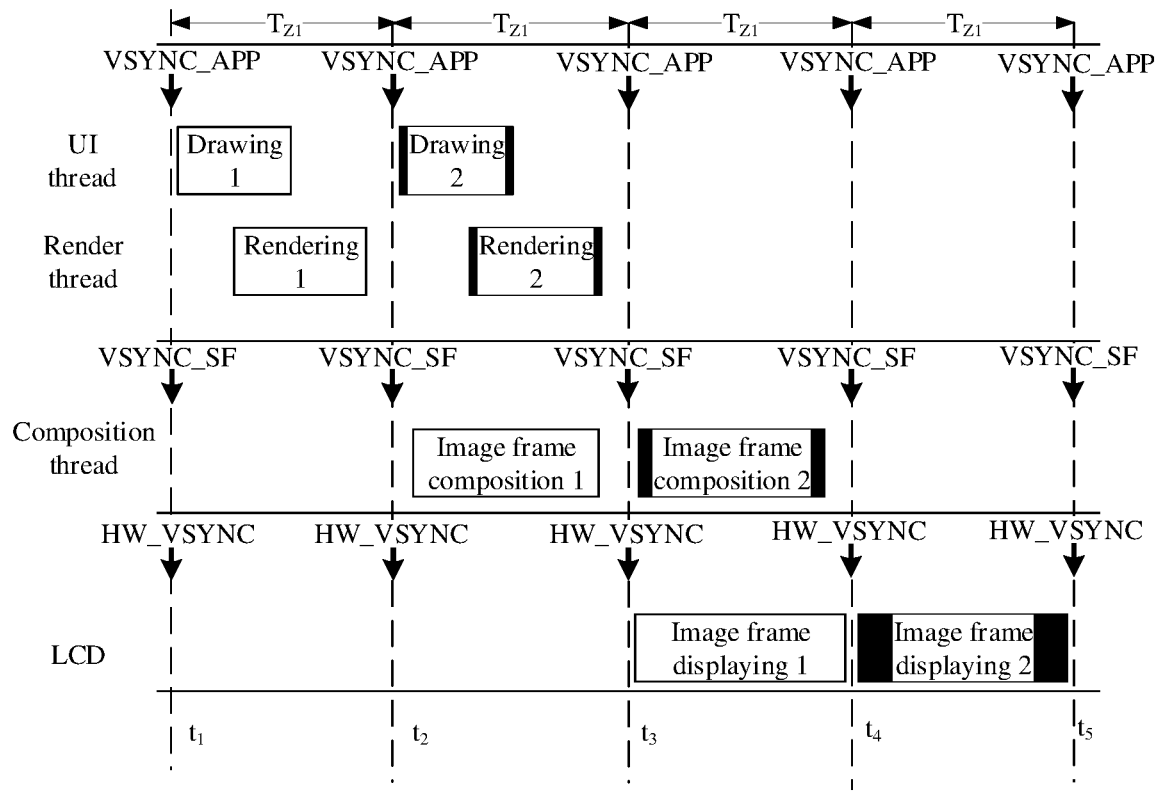
FIG. 4 is a schematic diagram of a principle of layer drawing, rendering, and composition, and image frame displaying performed by an electronic device in a conventional technology.

For example, as shown in FIG. 4, in response to a VSYNC_APP signal at a moment $t_1$, the UI thread of the electronic device performs "drawing 1" to draw a layer 1, and then the render thread performs "rendering 1" to render the layer 1; in response to a VSYNC_SF signal at a moment $t_2$, the composition thread of the electronic device performs "image frame composition 1" to perform layer composition on the layer 1 to obtain an image frame 1; and in response to an HW_VSYNC signal at a moment $t_3$, the LCD of the electronic device performs "image frame displaying 1" to refresh and display the image frame 1.

For another example, as shown in FIG. 4, in response to a VSYNC_APP signal at the moment $t_2$, the UI thread of the electronic device performs "drawing 2" to draw a layer 2, and then the render thread performs "rendering 2" to render the layer 2; in response to a VSYNC_SF signal at the moment $t_3$, the composition thread of the electronic device performs "image frame composition 2" to perform layer composition on the layer 2 to obtain an image frame 2; and in response to an HW_VSYNC signal at a moment $t_4$, the LCD of the electronic device performs "image frame displaying 2" to refresh and display the image frame 2.

In a process in which the electronic device performs layer drawing, rendering, and composition, and image frame refreshing and displaying in response to the VSYNC_APP signal, the VSYNC_SF signal, and the HW_VSYNC signal, a frame loss may occur. Specifically, in a process in which the display refreshes and displays the image frame, a frame of blank image may be displayed. In this way, coherence and smoothness of an image displayed on the display may be affected, thereby affecting visual experience of the user.

Figure 6:
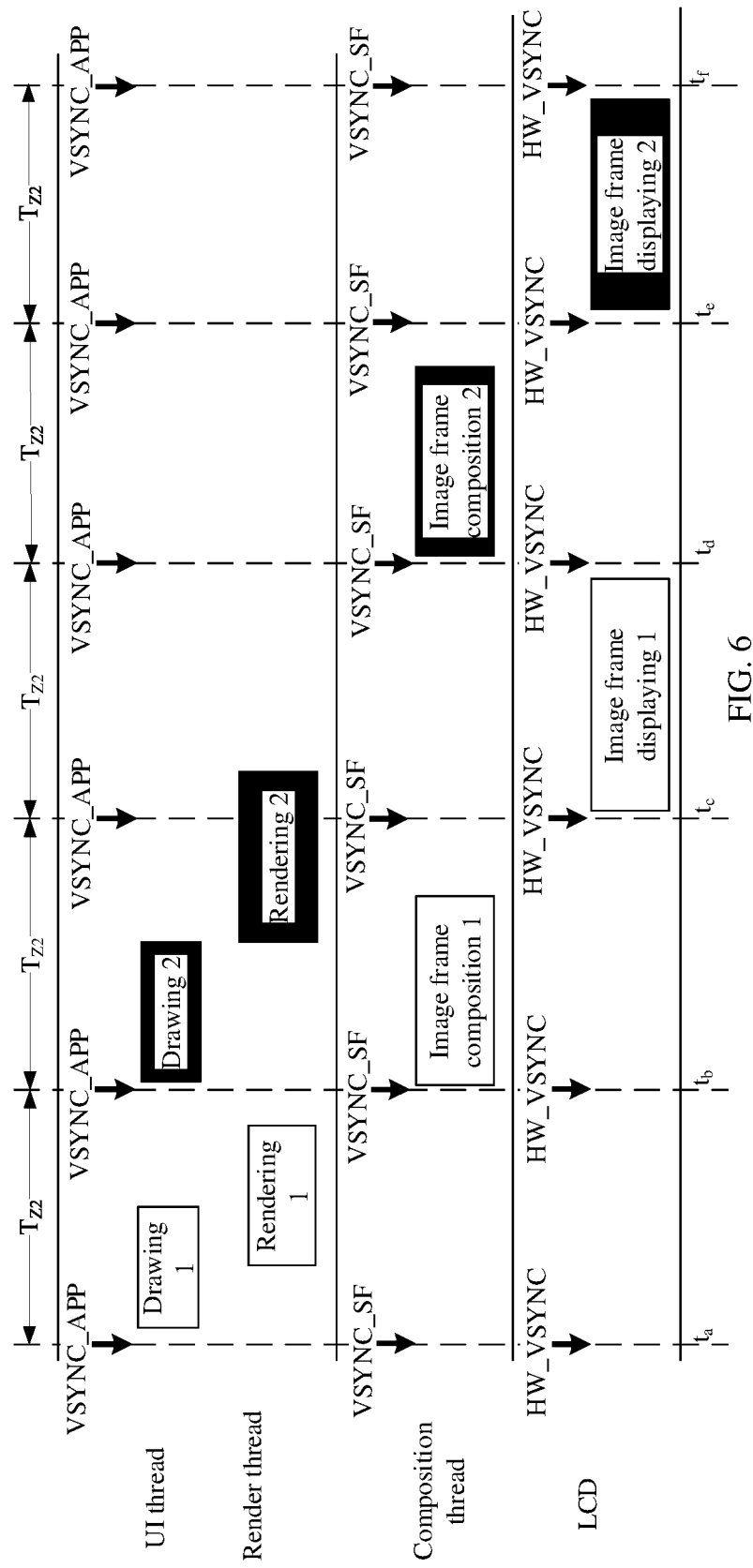
FIG. 6 is a schematic diagram of a principle of layer drawing, rendering, and composition, and image frame displaying performed by an electronic device in a high frame rate scenario in a conventional technology.

For example, as shown in FIG. 6, in response to a VSYNC_APP signal at a moment $t_a$, the UI thread of the electronic device performs "drawing 1" to draw a layer 1, and the render thread performs "rendering 1" to render the layer 1; in response to a VSYNC_SF signal at a moment $t_b$, the composition thread of the electronic device performs "image frame composition 1" to perform layer composition on the layer 1 to obtain an image frame 1; and in response to an HW_VSYNC signal at a moment $t_c$, the LCD of the electronic device performs "image frame displaying 1" to refresh and display the image frame 1.

As shown in FIG. 6, in response to a VSYNC_APP signal at the moment $t_b$, the UI thread of the electronic device performs "drawing 2" to draw a layer 2, and the render thread performs "rendering 2" to render the layer 2. As shown in FIG. 6, because duration required for the "rendering 2" is relatively large, the "drawing 2" and the "rendering 2" cannot be completed within one synchronization period (such as one synchronization period from the moment $t_b$ to the moment t). To be specific, the electronic device has not completed the "rendering 2" before a VSYNC_SF signal at the moment $t_c$ arrives. Therefore, the electronic device can only wait for an HW_VSYNC signal at a moment $t_d$ to arrive, and perform "image frame composition 2" in response to a VSYNC_SF signal at the moment $t_d$. In this way, the electronic device can only wait for a vertical synchronization signal 3 at a moment $t_e$ to arrive, and in response to the vertical synchronization signal 3 at the moment $t_e$, the electronic device performs "image frame displaying 2".

Similarly, duration spent by the UI thread in drawing a layer is relatively large, and consequently, "drawing" and "rendering" cannot be completed within one synchronization period (not shown in the figure).

It can be learned from FIG. 6 that, in one synchronization period from the moment to to the moment $t_e$, a frame loss occurs when an image is displayed on the display, in other words, a frame of blank image is displayed on the display. However, according to the method in this embodiment of this application, a frame loss can be avoided when an image is displayed, to prevent a frame of blank image from being displayed on the display. In other words, according to the method in this embodiment of this application, a possibility that a frame loss occurs when the electronic device displays an image can be decreased, and smoothness of displaying an image on the display can be ensured, thereby improving visual experience of a user.

It should be noted that a reason why a frame loss occurs when an image is displayed on the display of the electronic device is not only that the duration spent by the UI thread in drawing a layer is relatively large or duration spent by the render thread in rendering a layer is relatively large, but also that a frame rate and a screen refresh rate of the electronic device are relatively high. Specifically, compared with a low frame rate scenario, in a high frame rate scenario of the electronic device, a quantity of image frames displayed by the electronic device within one second increases. In this way, signal periods (namely, the foregoing synchronization periods) of the VSYNC_APP signal, the VSYNC_SF signal, and the HW_VSYNC signal become smaller. To ensure that a frame loss does not occur when an image is displayed on the display of the electronic device, the UI thread and the render thread need to complete layer drawing and rendering within the foregoing smaller signal periods.

Figure 5:
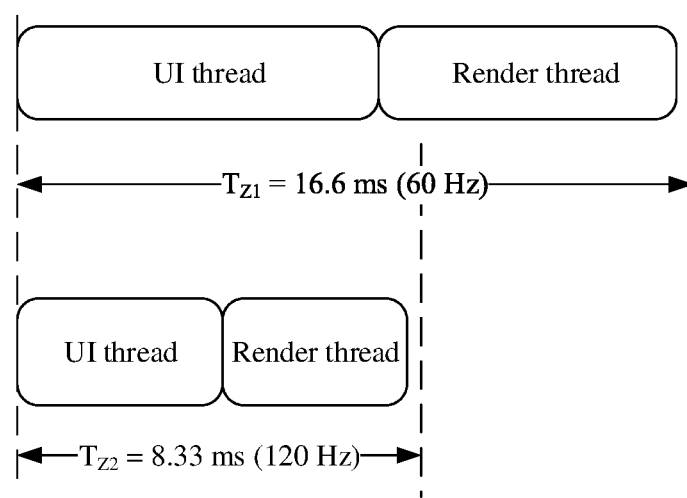
FIG. 5 is a schematic diagram of synchronization periods at different frame rates according to an embodiment of this application.

For example, as shown in FIG. 5 or FIG. 4, when the frame rate of the electronic device is 60 Hz, the signal period TZ1 of each of the VSYNC_APP signal, the VSYNC_SF signal, and the HW_VSYNC signal is equal to 16.66 ms. If the UI thread and the render thread can complete drawing and rendering of each frame of layer within 16.66 ms, a frame loss does not occur when an image is displayed on the display of the electronic device.

For another example, as shown in FIG. 5 or FIG. 6, after the frame rate of the electronic device increases to 120 Hz, a signal period $T_{Z2}$ of each of the VSYNC_APP signal, the VSYNC_SF signal, and the HW_VSYNC signal is equal to 8.33 ms. If the UI thread and the render thread can complete drawing and rendering of each frame of layer within 8.33 ms, a frame loss does not occur when an image is displayed on the display of the electronic device.

It may be understood that, compared with completing drawing and rendering of one frame of layer within 16.66 ms, it is relatively difficult for the electronic device to complete drawing and rendering of one frame of layer within 8.33 ms. Therefore, in a high frame rate scenario, there is a relatively high possibility that a frame loss occurs when an image is displayed on the display of the electronic device.

In some current solutions, working frequencies of the CPU and the GPU of the electronic device are increased, to decrease a possibility that a frame loss occurs when the electronic device displays an image, and ensure smoothness of displaying an image on the display. Increasing the working frequencies of the CPU and the GPU of the electronic device can increase processing speeds of the UI thread and the render thread, thereby reducing duration spent by the UI thread and the render thread in drawing a layer and rendering a layer, and further reducing a possibility that a frame loss occurs when the electronic device displays an image. However, increasing the working frequencies of the CPU and the GPU of the electronic device increases power consumption of the electronic device, and reduces a standby time of the electronic device. It can be learned that energy efficiency is relatively low in a solution in which a frame loss rate is decreased by increasing a working frequency.

An embodiment of this application provides an image processing method based on a vertical synchronization signal, to decrease, without increasing power consumption of the electronic device, a possibility that a frame loss occurs when an electronic device displays an image, and ensure smoothness of displaying an image on a display.

For example, the method provided in this embodiment of this application may be performed by an image processing apparatus. The apparatus may be any one of the foregoing electronic devices (for example, the apparatus may be the electronic device 100 shown in FIG. 1). Alternatively, the apparatus may be a central processing unit (Central Processing Unit, CPU) of the electronic device, or a control module that is in the electronic device and configured to perform the method provided in this embodiment of this application. In this embodiment of this application, the method provided in this embodiment of this application is described by using an example in which the electronic device (such as a mobile phone) performs the image processing method.

Embodiment (1)

Figure 7:
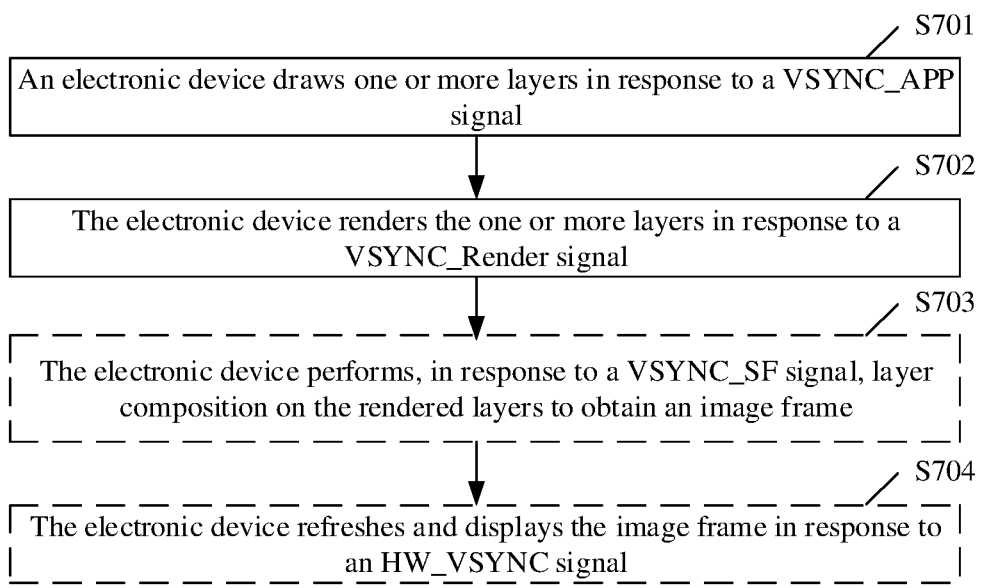
FIG. 7 is a flowchart of an image processing method based on a vertical synchronization signal according to an embodiment of this application.

This embodiment of this application provides an image processing method based on a vertical synchronization signal. The method may be applied to an electronic device including a display. In this embodiment, the electronic device may add one stage of pipeline for a render thread of the electronic device, which is referred to as a vertical synchronization signal 1' (such as a VSYNC_Render signal). The render thread renders a layer in response to the VSYNC_Render signal. In this embodiment, a vertical synchronization signal 1 (such as a VSYNC_APP signal) is a first vertical synchronization signal, and the vertical synchronization signal 1' (such as the VSYNC_Render signal) is a second vertical synchronization signal. As shown in FIG. 7, the image processing method based on a vertical synchronization signal may include S701 to S704.

S701: The electronic device draws one or more layers in response to a VSYNC_APP signal.

S702: The electronic device renders the one or more layers in response to a VSYNC_Render signal.

Usually, a render thread of the electronic device performs layer rendering on the one or more layers after a UI thread draws the one or more layers, and the UI thread periodically draws the layers based on the VSYNC_APP signal. To be specific, the UI thread and the render thread draw and render the layers based on one stage of pipeline, namely, the VSYNC_APP signal.

For example, as shown in FIG. 6, in response to a VSYNC_APP signal at a moment $t_a$, the UI thread of the electronic device performs "drawing 1" to draw a layer 1. After the UI thread completes the "drawing 1", the render thread performs "rendering 1" to render the layer 1. For another example, as shown in FIG. 6, in response to a VSYNC_APP signal at a moment $t_b$, the UI thread of the electronic device performs "drawing 2" to draw a layer 2. After the UI thread completes the "drawing 2", the render thread performs "rendering 2" to render the layer 2.

According to the solution in FIG. 6, if the UI thread and the render thread can complete drawing and rendering of each frame of layer within one synchronization period $T_{Z2}$, a frame loss does not occur when an image is displayed on the display of the electronic device. However, in a high frame rate scenario, the synchronization period TZ2 is relatively small, and a possibility that the electronic device completes drawing and rendering of one frame of layer within one synchronization period $T_{Z2}$ is relatively low. In this way, a frame loss occurs when an image is displayed on the display of the electronic device.

However, in this embodiment of this application, the UI thread and the render thread are not required to complete drawing and rendering of each frame of layer within one synchronization period $T_{Z2}$. Specifically, in this embodiment of this application, one stage of pipeline, referred to as a VSYNC_Render signal, may be added for the render thread of the electronic device. Instead of rendering a layer immediately after the UI thread has completed drawing of a layer, the render thread renders the layer in response to the VSYNC_Render signal. The VSYNC_Render signal and the VSYNC_APP signal have the same frequency.

In this embodiment of this application, as long as the UI thread may complete the drawing of each frame of layer within one synchronization period $T_{Z2}$ in response to the VSYNC_APP signal, and the render thread may complete the rendering of each frame of layer within one synchronization period $T_{Z2}$ in response to the VSYNC_Render signal, a frame loss does not occur when an image is displayed on the display of the electronic device.

Figure 8:
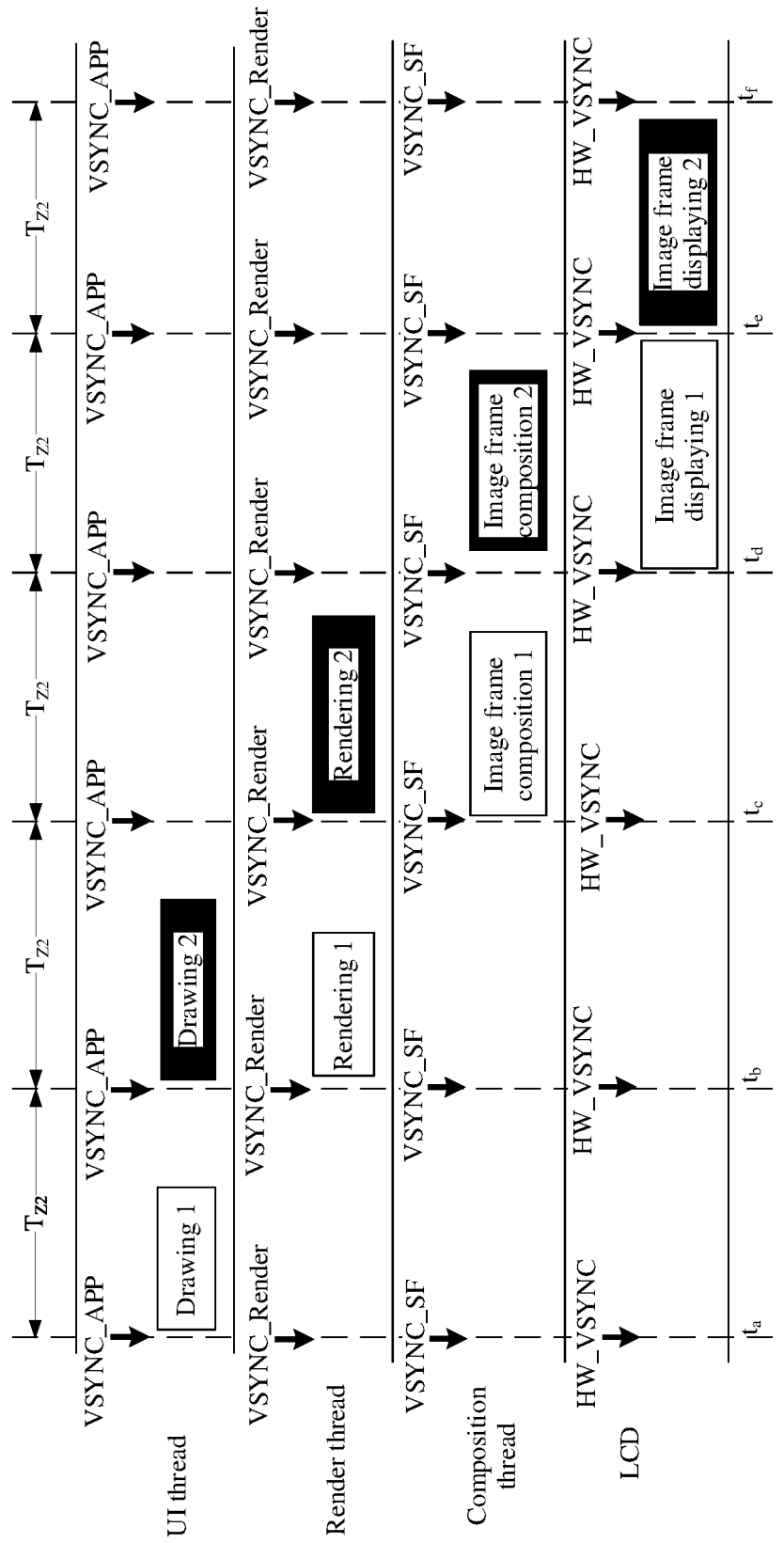
FIG. 8 is a schematic diagram of a principle of layer drawing, rendering, and composition, and image frame displaying performed by an electronic device according to an embodiment of this application.

For example, as shown in FIG. 8, in response to a VSYNC_APP signal at a moment $t_a$, the UI thread of the electronic device performs "drawing 1" to draw a layer 1; and in response to a VSYNC_Render signal at a moment $t_b$, the render thread of the electronic device performs "rendering 1" to render the layer 1. In this way, as long as the UI thread can complete the "drawing 1" within one synchronization period $T_{Z2}$ from the moment $t_a$ to the moment $t_b$, the render thread can complete the "rendering 1" within one synchronization period $T_{Z2}$ from the moment $t_b$ to a moment $t_c$, and when an image is displayed on the display of the electronic device, a frame loss does not occur because the drawing and rendering of the layer 1 by the electronic device time out.

For another example, as shown in FIG. 8, in response to a VSYNC_APP signal at the moment $t_b$, the UI thread of the electronic device performs "drawing 2" to draw a layer 2; and in response to a VSYNC_Render signal at the moment $t_c$, the render thread of the electronic device performs "rendering 2" to render the layer 2. In this way, as long as the UI thread can complete the "drawing 2" within one synchronization period $T_{Z2}$ from the moment $t_b$ to the moment $t_c$, the render thread can complete the "rendering 2" within one synchronization period $T_{Z2}$ from the moment $t_c$ to a moment $t_d$, and when an image is displayed on the display of the electronic device, a frame loss does not occur because the drawing and rendering of the layer 2 by the electronic device time out.

In this embodiment of this application, the electronic device may buffer a rendered layer in an SF buffer (Buffer) queue. The SF buffer may buffer the rendered layer in a queue manner according to a first in first out rule. In response to a VSYNC_SF signal, the electronic device may perform layer composition on the layer in the SF buffer to obtain an image frame; and in response to an HW_VSYNC signal, refresh and display the image frame. Specifically, after S702, the method in this embodiment of this application may further include S703 and S704.

S703: The electronic device performs, in response to a VSYNC_SF signal, layer composition on the rendered layers to obtain an image frame.

S704: The electronic device refreshes and displays the image frame in response to an HW_VSYNC signal.

For example, as shown in FIG. 8, in response to a VSYNC_SF signal at the moment $t_c$, a composition thread of the electronic device performs "image frame composition 1" to obtain an image frame 1; and in response to an HW_VSYNC signal at the moment $t_d$, an LCD of the electronic device performs "image frame displaying 1" to refresh and display the image frame 1.

For another example, as shown in FIG. 8, in response to a VSYNC_SF signal at the moment $t_d$, the composition thread of the electronic device performs "image frame composition 2" to obtain the image frame 1; and in response to an HW_VSYNC signal at a moment $t_e$, the LCD of the electronic device performs "image frame displaying 2" to refresh and display the image frame 2.

It should be noted that, when the foregoing one or more first layers include only one layer, that the electronic device performs layer composition on the layer specifically includes: The electronic device performs format conversion on the layer, and converts the layer into an image frame. When the one or more layers include a plurality of layers, that the electronic device performs layer composition on the plurality of layers specifically includes: The electronic device performs layer composition on the plurality of layers, to obtain an image frame.

In this embodiment of this application, one stage of pipeline, namely, the VSYNC_Render signal, is added, so that more time can be reserved for the UI thread of the electronic device to perform layer drawing, and more time can be reserved for the render thread to perform layer rendering. For example, as shown in FIG. 6, in a solution of a conventional technology, the UI thread draws a layer and the render thread renders the layer within one synchronization period $T_{Z2}$. As shown in FIG. 8, in the method in this embodiment of this application, the UI thread draws a layer within one synchronization period $T_{Z2}$, and the render thread renders the layer within another synchronization period $T_{Z2}$.

A possibility that the UI thread of the electronic device completes drawing of one frame of layer within one synchronization period $T_{Z2}$ and a possibility that the render thread completes rendering of one frame of layer within one synchronization period $T_{Z2}$ are higher than a possibility that the UI thread and the render thread can complete drawing and rendering of one frame of layer within one synchronization period $T_{Z2}$. For example, as shown in FIG. 8, although duration required by the UI thread to perform the "drawing 2" is relatively large, the UI thread may still perform the "drawing 2" within one synchronization period $T_{Z2}$; and although duration required by the render thread to perform the "rendering 2" is relatively large, the render thread may still perform the "rendering 2" within one synchronization period $T_{Z2}$. As shown in FIG. 8, no frame loss occurs when the electronic device displays an image. In conclusion, according to the method in this embodiment of this application, a possibility that a frame loss occurs when the electronic device displays an image can be decreased, and smoothness of displaying an image on the display can be ensured, thereby improving visual experience of a user.

In addition, according to the method in this embodiment of this application, the electronic device does not need to increase working frequencies of a CPU and a GPU of the electronic device. In other words, the method in this embodiment of this application may be used, to decrease, without increasing power consumption of the electronic device, a possibility that a frame loss occurs when an electronic device displays an image, and ensure smoothness of displaying an image on a display.

Embodiment (2)

An electronic device may choose to use a solution of a conventional technology to perform layer drawing, rendering, and composition, and image frame displaying, or may choose to perform S701 to S704 to perform layer drawing, rendering, and composition, and image frame displaying. In other words, the electronic device does not perform S701 to S704 in all scenarios. In this embodiment of this application, a specific scenario or condition in which the electronic device performs S701 to S704 to perform layer drawing, rendering, and composition, and image frame displaying is described herein.

In an implementation, the electronic device may perform S701 to S704 in a high frame rate scenario. It can be learned from the description of the foregoing embodiment that, in the high frame rate scenario, there is a high possibility that a frame loss occurs when the electronic device displays an image. Therefore, in the high frame rate scenario, the electronic device may perform S701 to S704, to decrease the possibility that a frame loss occurs when the electronic device displays an image, and ensure smoothness of displaying an image on a display.

The electronic device may determine, based on a screen refresh rate of the electronic device, whether the electronic device is in the high frame rate scenario. Specifically, the electronic device may determine whether the screen refresh rate of the electronic device is greater than a preset refresh rate threshold. If the screen refresh rate of the electronic device is greater than the preset refresh rate threshold, the electronic device may perform S701 to S704. If the screen refresh rate of the electronic device is less than or equal to the preset refresh rate threshold, the electronic device may perform a method in the conventional technology. The method in the conventional technology may include S701', S703, and S704. S701': The electronic device draws one or more layers in response to a VSYNC_APP signal, and renders the one or more layers.

For example, the preset refresh rate threshold may be any value such as 90 Hz or 120 Hz. The preset refresh rate threshold may be preset in the electronic device. Alternatively, the preset refresh rate threshold may be set by a user in the electronic device.

In another implementation, the electronic device may perform S701 to S704 in a non-game scenario. Usually, the electronic device requires a low latency of the electronic device in a game scenario. In other words, the electronic device has a relatively high requirement on a latency in the game scenario. Through comparison between the solution of the conventional technology shown in FIG. 6 and the solution of the embodiment of this application shown in FIG. 8, it can be learned that according to the method in this embodiment of this application, although a possibility that a frame loss occurs when the electronic device displays an image can be decreased, a response latency of the electronic device from drawing a frame of layer to refreshing and displaying an image frame corresponding to the layer is also prolonged.

For example, as shown in FIG. 6, starting from performing "drawing 1" at a moment $t_a$, the electronic device can perform "image frame displaying 1" until a moment $t_c$ to refresh and display an image frame 1. A response latency of the electronic device from drawing a layer 1 to refreshing and displaying the image frame 1 is two synchronization periods $T_{Z2}$ from the moment $t_a$ to the moment $t_c$. As shown in FIG. 8, starting from performing "drawing 1" at a moment $t_a$, the electronic device can perform "image frame displaying 1" until a moment $t_d$ to refresh and display an image frame 1. A response latency of the electronic device from drawing a layer 1 to refreshing and displaying the image frame 1 is three synchronization periods $T_{Z2}$ from the moment $t_a$ to the moment $t_d$.

Therefore, in a non-game scenario (to be specific, a latency requirement is relatively low), the electronic device may perform S701 to S704, to decrease the possibility that a frame loss occurs when the electronic device displays an image, and ensure smoothness of displaying an image on the display.

Specifically, the electronic device may perform S701 to S704 when a current application of the electronic device is a preset application. The preset application does not include a game application. When the current application of the electronic device is a game application, the electronic device may perform S701', S703, and S704.

Figure 9:
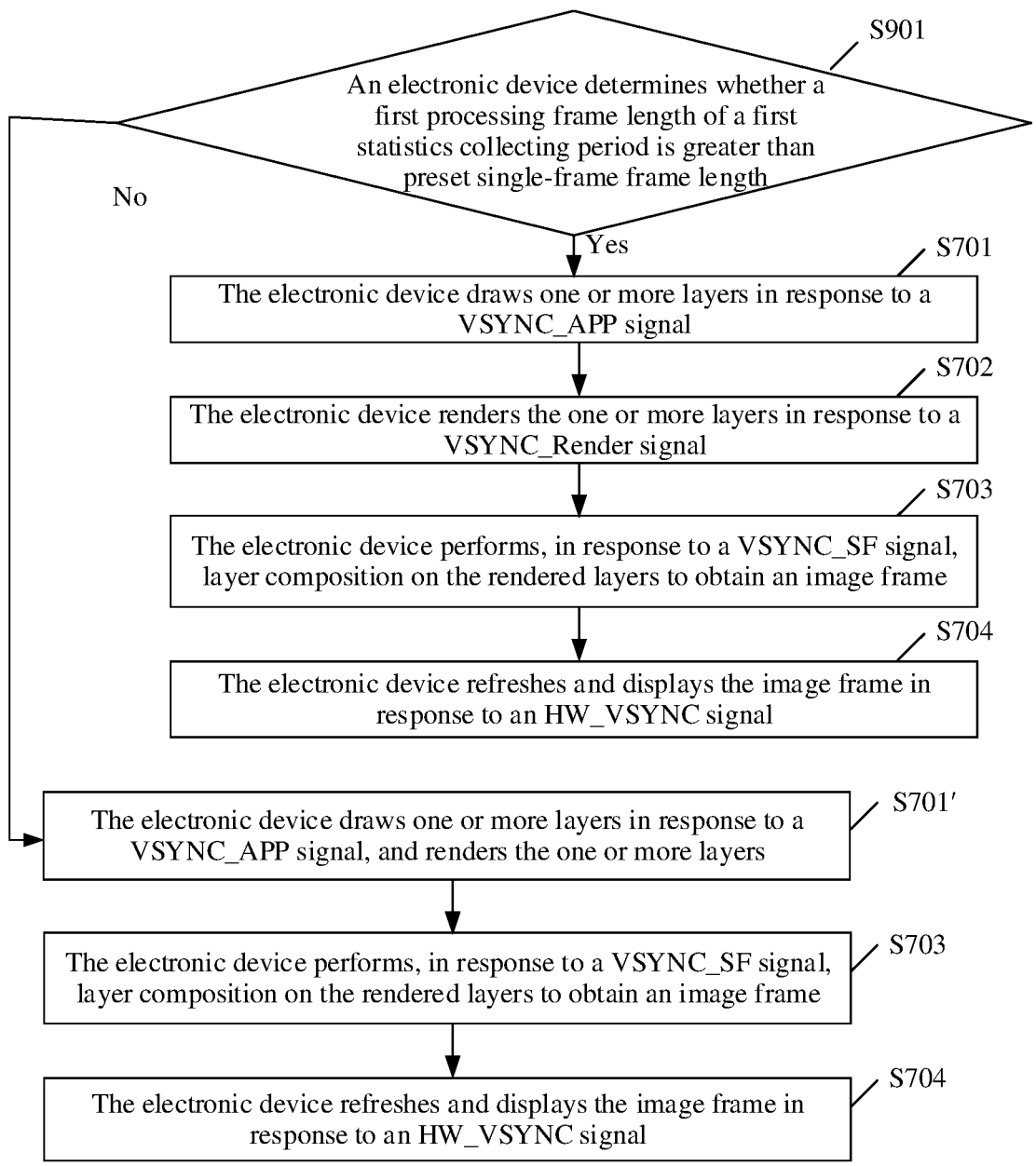
FIG. 9 is another flowchart of an image processing method based on a vertical synchronization signal according to an embodiment of this application.

In another implementation, compared with Embodiment (1), before performing S701 to S704, the electronic device may first predict whether duration required by the electronic device to perform layer drawing and rendering is greater than a preset single-frame frame length (the preset single-frame frame length is less than or equal to the foregoing synchronization period). If it is predicted that the duration required by the electronic device to perform layer drawing and rendering is greater than the preset single-frame frame length, it indicates that a possibility that the electronic device completes layer drawing and rendering within one synchronization period is relatively low, and the possibility that a frame loss occurs when the electronic device displays an image is relatively high. In this case, the electronic device may perform S701 to S704. Specifically, as shown in FIG. 9, before S701 to S704, the method in this embodiment of this application may further include S901.

S901: The electronic device determines whether a first processing frame length of a first statistics collecting period is greater than the preset single-frame frame length.

The first processing frame length is a sum of a first drawing frame length and a first rendering frame length. The first drawing frame length is duration required by the electronic device to perform layer drawing. The first rendering frame length is duration required by the electronic device to perform layer rendering on a drawn layer.

For example, the electronic device may periodically collect statistics on a first processing frame length within each statistics collecting period. The first statistics collecting period is a statistics collecting period previous to a current moment. For example, a statistics collecting period in this embodiment of this application may be any duration such as 1 s, 2 s, 3 s, or 5 s. For example, the electronic device may perform S901*a* and S901*b*, to obtain the first processing frame length of the first statistics collecting period.

S901*a*: The electronic device obtains one or more second processing frame lengths of the first statistics collecting period, and each second processing frame length is a sum of a first drawing frame length and a first rendering frame length.

The electronic device may collect statistics on duration (namely, the first drawing frame length) required for drawing a layer each time within the first statistics collecting period and duration (namely, the first rendering frame length) required for rendering the layer, and calculate a sum of the first drawing frame length and the corresponding first rendering frame length, to obtain total duration (namely, the second processing frame length) required for layer drawing and rendering each time.

For example, it is assumed that the electronic device performs layer drawing and rendering three times within the first statistics collecting period. Duration required by the electronic device to draw a layer a is a first drawing frame length a, and duration required by the electronic device to render the layer a is a first rendering frame length a. Duration required by the electronic device to draw a layer b is a first drawing frame length b, and duration required by the electronic device to render the layer b is a first rendering frame length b. Duration required by the electronic device to draw a layer c is a first drawing frame length c, and duration required by the electronic device to render the layer a is a first rendering frame length c. The electronic device may calculate a sum of the first drawing frame length a and the first rendering frame length a to obtain a second processing frame length a, calculate a sum of the first drawing frame length b and the first rendering frame length bb to obtain a second processing frame length b, and calculate a sum of the first drawing frame length c and the first rendering frame length c to obtain a second processing frame length c. In this way, the electronic device may obtain the three second processing frame lengths within the first statistics collecting period.

S901b. The electronic device determines a first processing frame length based on one or more second processing frame lengths.

In an implementation, the one or more second processing frame lengths include only one second processing frame length. In this implementation, the first processing frame length is equal to the second processing frame length.

In an implementation, the one or more second processing frame lengths may include a plurality of second processing frame lengths. The first processing frame length is an average value of the plurality of second processing frame lengths. With reference to the foregoing example, the first processing frame length of the first statistics collecting period may be an average value of the second processing frame length a, the second processing frame length b, and the second processing frame length c.

In another implementation, the one or more second processing frame lengths may include a plurality of second processing frame lengths. The first processing frame length is a greatest second processing frame length in the plurality of second processing frame lengths. With reference to the foregoing example, the first processing frame length of the first statistics collecting period may be a greatest value in the second processing frame length a, the second processing frame length b, and the second processing frame length c.

The preset single-frame frame length in this embodiment of this application is less than or equal to a synchronization period. For example, the preset single-frame frame length may be a difference between the synchronization period and a preset latency threshold.

It may be understood that after S901, if the first processing frame length of the first statistics collecting period (namely, a statistics collecting period previous to a current moment) is greater than the preset single-frame frame length, it indicates that the electronic device cannot complete layer drawing and rendering within one synchronization period in the first statistics collecting period. In this case, in a next statistics collecting period (namely, a statistics collecting period in which the current moment is located) of the first statistics collecting period, a possibility that the electronic device completes layer drawing and rendering within one synchronization period is relatively low, and a possibility that a frame loss occurs when the electronic device displays an image is relatively high. In this case, the electronic device may perform S701 to S704, to decrease the possibility that a frame loss occurs when the electronic device displays an image, and ensure smoothness of displaying an image on the display.

In this embodiment of this application, one stage of pipeline, namely, a VSYNC_Render signal, may be added for the electronic device when it is predicted that the duration required by the electronic device to perform layer drawing and rendering is greater than the preset single-frame frame length, so that the electronic device renders a layer in response to the VSYNC_Render signal. In this way, the electronic device performs S701 to S704 when the possibility that the electronic device completes layer drawing and rendering within one synchronization period is relatively low, so that the possibility that a frame loss occurs when the electronic device displays an image can be decreased, and smoothness of displaying an image on the display can be ensured.

It should be noted that in this embodiment of this application, that the electronic device performs layer drawing and rendering in one synchronization period may specifically include: drawing one or more layers in a first synchronization period in response to a VSYNC_APP signal, and rendering the one or more layers. The first synchronization period is a synchronization period corresponding to the VSYNC_APP signal. For example, the first synchronization period may be one synchronization period $T_{Z2}$ from the moment $t_a$ to a moment $t_b$ shown in FIG. 6.

If the first processing frame length of the first statistics collecting period (namely, the statistics collecting period previous to the current moment) is less than or equal to the preset single-frame frame length, it indicates that the electronic device can complete layer drawing and rendering within one synchronization period in the first statistics collecting period. In this case, in a next statistics collecting period (namely, a statistics collecting period in which the current moment is located) of the first statistics collecting period, a possibility that the electronic device completes layer drawing, rendering, and composition within one synchronization period is relatively high, and the possibility that a frame loss occurs when the electronic device displays an image is relatively low.

It should be noted that, when the first processing frame length of the first statistics collecting period is less than or equal to the preset single-frame frame length, the possibility that a frame loss occurs when the electronic device displays an image. Therefore, S701 to S704 does not need to be performed to decrease the possibility that a frame loss occurs when the electronic device displays an image. In addition, it can be learned from the foregoing embodiment that when the first processing frame length of the first statistics collecting period is less than or equal to the preset single-frame frame length, if the electronic device performs S701 to S704, a response latency of the electronic device from drawing a frame of layer to refreshing and displaying an image frame corresponding to the layer is prolonged. Therefore, in this case, the electronic device may perform S701', S703, and S704. Specifically, the electronic device may perform S701' in which the one or more layers are drawn in response to the VSYNC_APP signal, and the one or more layers are rendered.

Embodiment (3)

An electronic device performs the method in Embodiment (1) or Embodiment (2), even if one stage of pipeline, namely, a VSYNC_Render signal, is added, if duration required by a UI thread of the electronic device to draw a layer is relatively large, a frame loss still occurs when the electronic device displays an image.

Figure 10:
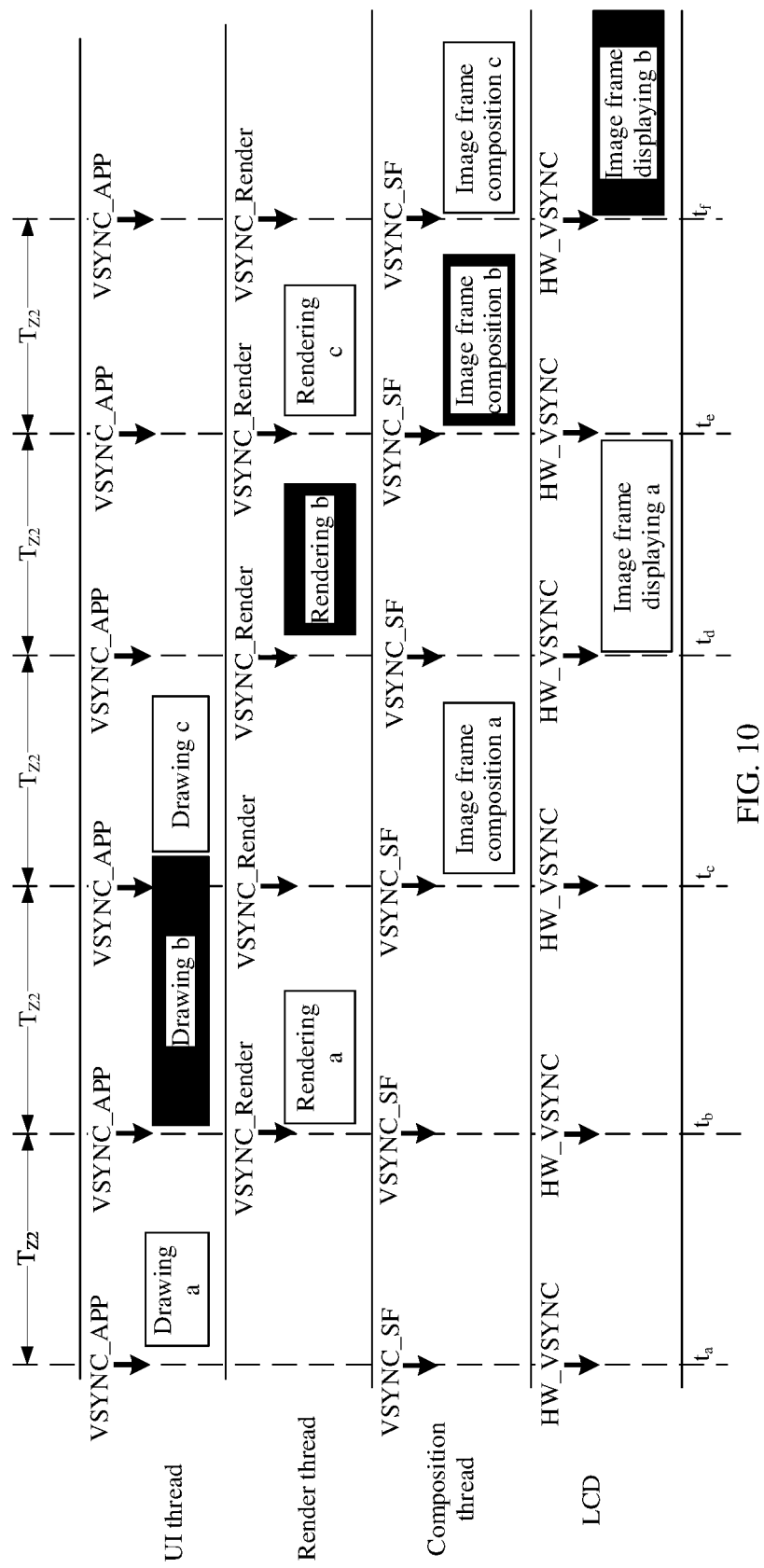
FIG. 10 is another schematic diagram of a principle of layer drawing, rendering, and composition, and image frame displaying performed by an electronic device according to an embodiment of this application.

For example, as shown in FIG. 10, the electronic device performs S701 in which in response to a VSYNC_APP signal at a moment $t_a$, the UI thread may perform "drawing a" to draw a layer a; the electronic device performs S702 in which in response to a VSYNC_Render signal at a moment $t_b$, a render thread may perform "rendering a" to render the layer a; the electronic device performs S703 in which in response to a VSYNC_SF signal at a moment $t_c$, a composition thread may perform "image frame composition a" to render the layer a; and the electronic device performs S704 in which in response to an HW_VSYNC signal at a moment $t_d$, an LCD may perform "image frame displaying a" to refresh and display an image frame a.

As shown in FIG. 10, the electronic device performs S701 in which in response to a VSYNC_APP signal at a moment $t_b$, the UI thread may perform "drawing b" to draw a layer b. As shown in FIG. 10, because duration required for the "drawing b" is relatively large, the UI thread cannot complete the drawing of the layer b within one synchronization period $T_{Z2}$ from the moment $t_b$ to the moment $t_c$, in other words, the UI thread cannot complete the "drawing b" beyond the moment $t_c$. Therefore, the render thread of the electronic device cannot perform "rendering b" to render the layer b in response to a VSYNC_Render signal at the moment $t_c$, and can only wait for a VSYNC_Render signal at the moment $t_d$ to arrive. The electronic device performs S702 in which the "rendering b" is performed in response to the VSYNC_Render signal at the moment $t_d$. Then, the electronic device performs S703 in which in response to a VSYNC_SF signal at a moment $t_e$, the composition thread of the electronic device performs "image frame composition b". The electronic device performs S704 in which in response to an HW_VSYNC signal at a moment $t_f$, the LCD of the electronic device performs "image frame displaying b" to refresh and display an image frame b. It can be learned from FIG. 10 that, in one synchronization period from the moment $t_e$ to the moment $t_f$, a frame loss occurs when an image is displayed on the display, in other words, a frame of blank image is displayed on the display.

To reduce the possibility that a frame loss occurs when an image is displayed on the display of the electronic device shown in FIG. 10, the electronic device may adjust the VSYNC_Render signal, so that the VSYNC_Render signal is delayed by first delay duration compared with the VSYNC_APP signal. In this way, a possibility that the UI thread completes a layer drawing task within one synchronization period can be increased. Therefore, the possibility that a frame loss occurs when the electronic device displays an image can be decreased, and smoothness of displaying an image on the display can be ensured.

Figure 11:
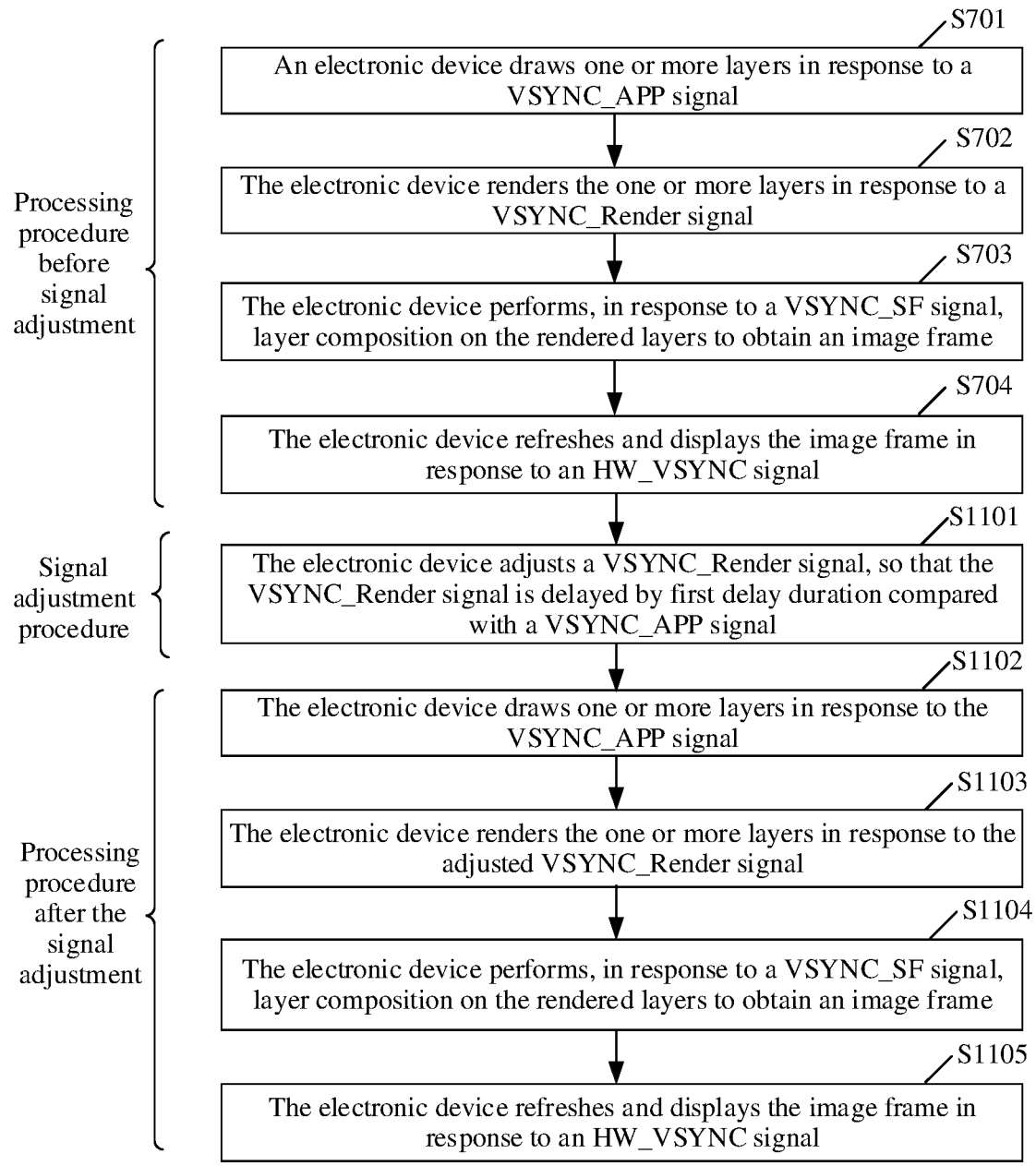
FIG. 11 is another flowchart of an image processing method based on a vertical synchronization signal according to an embodiment of this application.

Specifically, as shown in FIG. 11, the method in this embodiment of this application may include a "processing procedure before signal adjustment", a "signal adjustment procedure", and a "processing procedure after the signal adjustment". As shown in FIG. 11, the "processing procedure before signal adjustment" may include S701 to S704, the "signal adjustment procedure" may include S1101, and the "processing procedure after the signal adjustment" may include S1102 to S1105.

S1101: The electronic device adjusts a VSYNC_Render signal, so that the VSYNC_Render signal is delayed by first delay duration compared with a VSYNC_APP signal.

For a specific value of the first delay duration, refer to the detailed description in Embodiment (4) of this application. Details are not described herein again in this embodiment of this application.

Figure 12:
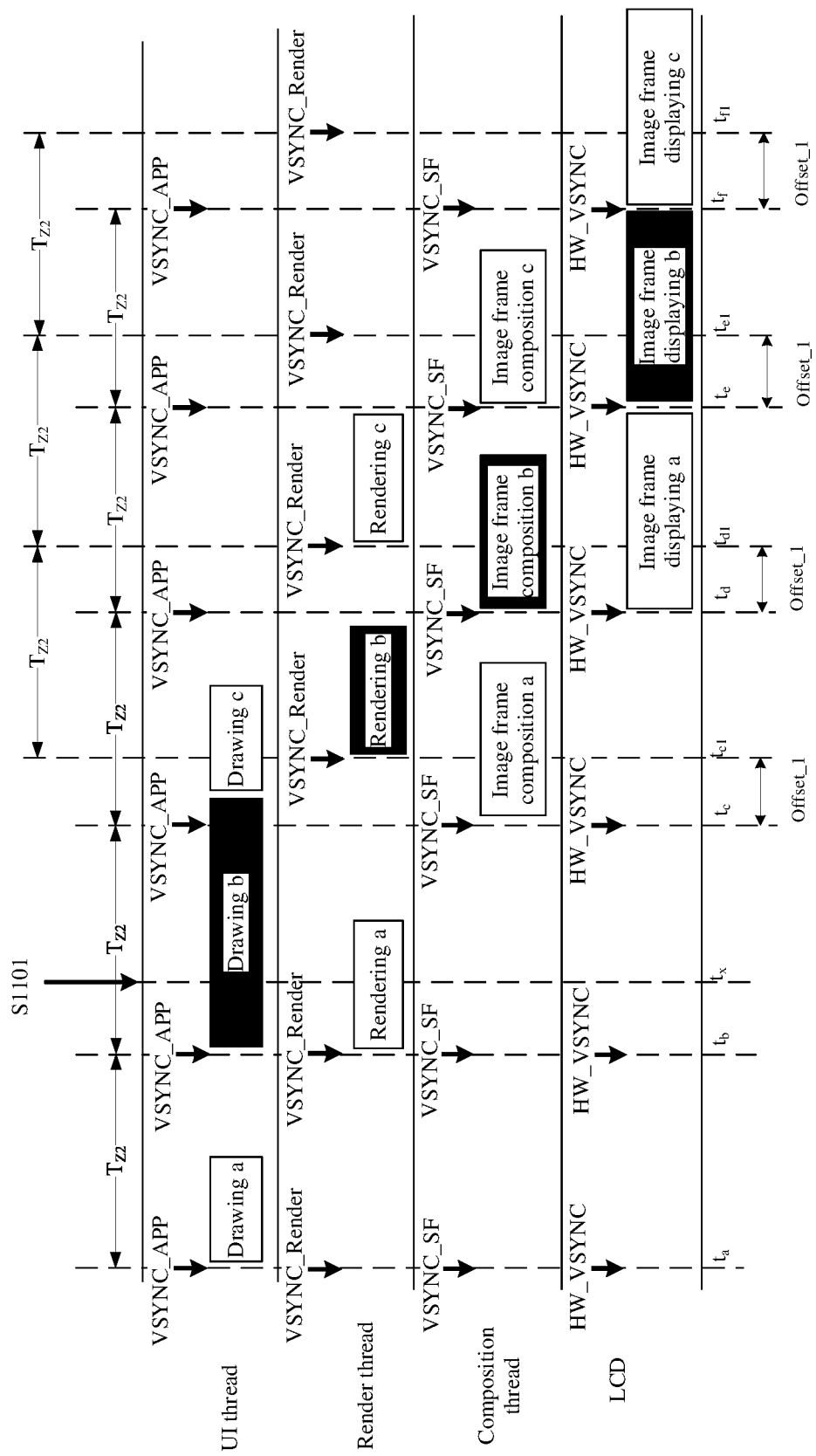
FIG. 12 is another schematic diagram of a principle of layer drawing, rendering, and composition, and image frame displaying performed by an electronic device according to an embodiment of this application.

With reference to FIG. 10, as shown in FIG. 12, it is assumed that the electronic device performs S1101 at a moment $t_x$. In this case, after the moment $t_x$ shown in FIG. 12, a VSYNC_Render signal is delayed by first delay duration Offset_1 relative to a VSYNC_APP signal. However, before the moment $t_x$, a delay time of a VSYNC_Render signal relative to a VSYNC_APP signal is zero.

For example, as shown in FIG. 12, at a moment $t_a$ and a moment $t_b$ before the moment $t_x$, a VSYNC_Render signal, a VSYNC_APP signal, a VSYNC_SF signal, and an HW_VSYNC signal arrive at the same time.

As shown in FIG. 12, at a moment $t_c$ after the moment $t_x$, a VSYNC_APP signal, a VSYNC_SF signal, and an HW_VSYNC signal arrive at the same time, but a VSYNC_Render signal arrives at a moment $t_{c1}$ after the moment $t_c$, where the moment $t_{c1}$ lags behind the moment $t_c$ by Offset_1; at a moment $t_d$ after the moment $t_x$, a VSYNC_APP signal, a VSYNC_SF signal, and an HW_VSYNC signal arrive at the same time, but a VSYNC_Render signal arrives at a moment $t_{d1}$ after the moment $t_d$, where the moment $t_{d1}$ lags behind the moment $t_d$ by Offset_1; at a moment $t_e$ after the moment $t_x$, a VSYNC_APP signal, a VSYNC_SF signal, and an HW_VSYNC signal arrive at the same time, but a VSYNC_Render signal arrives at a moment $t_{e1}$ after the moment $t_e$, where the moment $t_{e1}$ lags behind the moment $t_e$ by Offset_1; and at a moment $t_f$ after the moment $t_x$, a VSYNC_APP signal, a VSYNC_SF signal, and an HW_VSYNC signal arrive at the same time, but a VSYNC_Render signal arrives at a moment $t_{f1}$ after the moment $t_f$, where the moment $t_{f1}$ lags behind the moment $t_f$ by Offset_1.

It should be noted that, that the VSYNC_Render signal is delayed by the first delay duration compared with the VSYNC_APP signal may be understood as that the VSYNC_Render signal is delayed by the first delay duration compared with the HW_VSYNC signal.

Specifically, the HW_VSYNC is a hardware signal triggered by a display driver of the electronic device. There is one HW_VSYNC signal triggered by a hardware driver every one synchronization period. In a conventional technology, a VSYNC_APP signal and a VSYNC_SF signal are generated based on an HW_VSYNC signal. Therefore, the VSYNC_APP signal and the VSYNC_SF signal are in the same phase as the HW_VSYNC signal, in other words, a delay time of the VSYNC_APP signal and the VSYNC_SF signal compared with the HW_VSYNC signal is zero. Therefore, that the VSYNC_Render signal is delayed by the first delay duration compared with the VSYNC_APP signal may be understood as that the VSYNC_Render signal is delayed by the first delay duration compared with the HW_VSYNC signal. The electronic device may adjust the VSYNC_Render signal based on the HW_VSYNC signal (namely, a hardware signal), so that the VSYNC_Render signal is delayed by the first delay duration compared with the HW_VSYNC signal.

It should be noted that the "delay time of a VSYNC_Render signal relative to a VSYNC_APP signal" described in this embodiment of this application is: from a moment at which any VSYNC_APP signal arrives, a delay time of a VSYNC_Render signal that arrives within one synchronization period relative to the VSYNC_Render signal.

For example, as shown in FIG. 12, after the moment $t_x$, a "delay time of a VSYNC_Render signal relative to a VSYNC_APP signal or an HW_VSYNC signal" may be: a time difference between an arrival moment of the VSYNC_APP signal or the HW_VSYNC signal at the moment $t_c$ and an arrival moment of the VSYNC_Render signal at the moment $t_{c1}$, namely, duration from the moment $t_c$ to the moment $t_{c1}$; or a time difference between an arrival moment of the VSYNC_APP signal or the HW_VSYNC signal at the moment $t_d$ and an arrival moment of the VSYNC_Render signal at the moment $t_{d1}$, namely, duration from the moment to to the moment $t_{d1}$.

It should be noted that after the VSYNC_Render signal is adjusted so that the VSYNC_Render signal is delayed by the first delay duration compared with the VSYNC_APP signal, a phase difference exists between the VSYNC_Render signal and the VSYNC_APP signal. After the VSYNC_Render signal is adjusted so that a phase difference exists between the VSYNC_Render signal and the VSYNC_APP signal, the VSYNC_Render signal has a specific delay time (such as the first delay duration) relative to the VSYNC_APP signal. The VSYNC_Render signal is adjusted, so that a phase difference exists between the VSYNC_Render signal and the VSYNC_APP signal. After the phase difference is converted into duration, it may represent that the VSYNC_Render signal is delayed by the first delay duration.

S1102: The electronic device draws one or more layers in response to a VSYNC_APP signal.

S1103: The electronic device renders the one or more layers in response to the adjusted VSYNC_Render signal.

S1104: The electronic device performs, in response to a VSYNC_SF signal, layer composition on the rendered layers to obtain an image frame.

S1105: The electronic device refreshes and displays an image frame in response to an HW_VSYNC signal.

For example, as shown in FIG. 12, the electronic device performs S1102 in which the UI thread of the electronic device performs "drawing b" to draw a layer b in response to the VSYNC_APP signal at the moment $t_b$; the render thread of the electronic device performs "rendering b" to render a layer b in response to the VSYNC_Render signal at the moment $t_{c1}$; the composition thread of the electronic device performs "image frame composition b" in response to the VSYNC_SF signal at the moment $t_d$ to obtain an image frame b; and the LCD of the electronic device performs "image frame displaying b" in response to the HW_VSYNC signal at the moment $t_e$ to refresh and display the image frame b. Details of manners in which the electronic device performs "drawing c", "rendering c", "image frame composition c", and "image frame displaying c" shown in FIG. 12 are not described herein in this embodiment of this application.

It may be understood that, after the electronic device performs S1101, the VSYNC_Render signal is delayed by the first delay duration Offset_1 relative to the VSYNC_APP signal. For example, the VSYNC_Render signal at the moment $t_{c1}$ is delayed by Offset_1 compared with the VSYNC_APP signal at the moment $t_c$. In this way, before the VSYNC_Render signal at the moment $t_{c1}$ arrives, the UI thread may have more time (such as a time period from the moment $t_b$ to the moment $t_{c1}$) to perform the "drawing b". Duration of the time period from the moment $t_b$ to the moment $t_{c1}$ is $T_{Z2}$+Offset_1. In this way, even if the UI thread cannot complete the "drawing b" within one synchronization period $T_{Z2}$, the render thread may perform the "rendering b" to render the layer b as soon as possible (for example, performing the "rendering b" at the moment $t_{c1}$), and does not need to wait for a next VSYNC_Render signal (such as the VSYNC_Render signal at the moment $t_d$ shown in FIG. 10) after a synchronization period $T_{Z2}$, before performing the "rendering b". Therefore, as shown in FIG. 12, a frame loss does not occur when an image is displayed on the display of the electronic device. It can be learned that, according to the method in this embodiment, the possibility that a frame loss occurs when the electronic device displays an image can be decreased, and smoothness of displaying an image on the display can be ensured.

Embodiment (4)

In this embodiment, a condition in which the electronic device performs S1101 to S1105 in Embodiment (3) is described herein. Specifically, if a second drawing frame length of a second statistics collecting period is greater than preset single-frame duration, the electronic device may perform S1101 to S1105.

For example, the electronic device may periodically collect statistics on a second drawing frame length within each statistics collecting period. The second statistics collecting period is a statistics collecting period previous to a current moment. The second drawing frame length is duration required by the electronic device to perform layer drawing.

A method for obtaining, by the electronic device, the second drawing frame length of the second statistics collecting period may include: The electronic device may obtain one or more third drawing frame lengths of the second statistics collecting period; and determine the second drawing frame length based on the one or more third drawing frame lengths. When the one or more third drawing frame lengths include only one third drawing frame length, the third drawing frame length is equal to the third drawing frame length. When the one or more third drawing frame lengths include a plurality of third drawing frame lengths, the second drawing frame length is an average value of the plurality of third drawing frame lengths or a greatest third drawing frame length in the plurality of third drawing frame lengths.

It may be understood that, if the second drawing frame length of the second statistics collecting period is greater than the preset single-frame duration, it indicates that the electronic device cannot complete layer drawing within one synchronization period in the second statistics collecting period. In this case, in a next statistics collecting period (namely, a statistics collecting period in which the current moment is located) of the second statistics collecting period, a possibility that the electronic device completes layer drawing within one synchronization period is relatively low, and a possibility that a frame loss occurs when the electronic device displays an image is relatively high. In this case, the electronic device may perform S1101 to S1105, to decrease the possibility that a frame loss occurs when the electronic device displays an image, and ensure smoothness of displaying an image on the display.

In this embodiment of this application, a value of the first delay duration in Embodiment (3) is described herein.

In an implementation, the first delay duration Offset_1 is first preset duration. The first preset duration may be preset in the electronic device. Alternatively, the first preset duration may be set by a user in the electronic device. For example, the first preset duration may be any duration such as 2 milliseconds (ms), 2.5 ms, 3 ms, or 4 ms.

In another implementation, the first delay duration is greater than or equal to a difference between the second drawing frame length and the preset single-frame duration. In other words, the electronic device may determine the first delay duration based on the second drawing frame length and the preset single-frame duration.

For example, it is assumed that the preset single-frame frame length is 16.66 ms, and the second drawing frame length is 21 ms. Then, the first delay duration may be greater than or equal to a difference of 4.34 ms between the second drawing frame length 21 ms and the preset single-frame duration 16.66 ms. For example, the first delay duration may be any duration such as 4.4 ms, 5 ms, or 5.5 ms.

Embodiment (5)

An electronic device performs the method in Embodiment (1) or Embodiment (2), even if one stage of pipeline, namely, a VSYNC_Render signal, is added, if duration required by a render thread of the electronic device to render a layer is relatively large, a frame loss still occurs when the electronic device displays an image.

Figure 13:
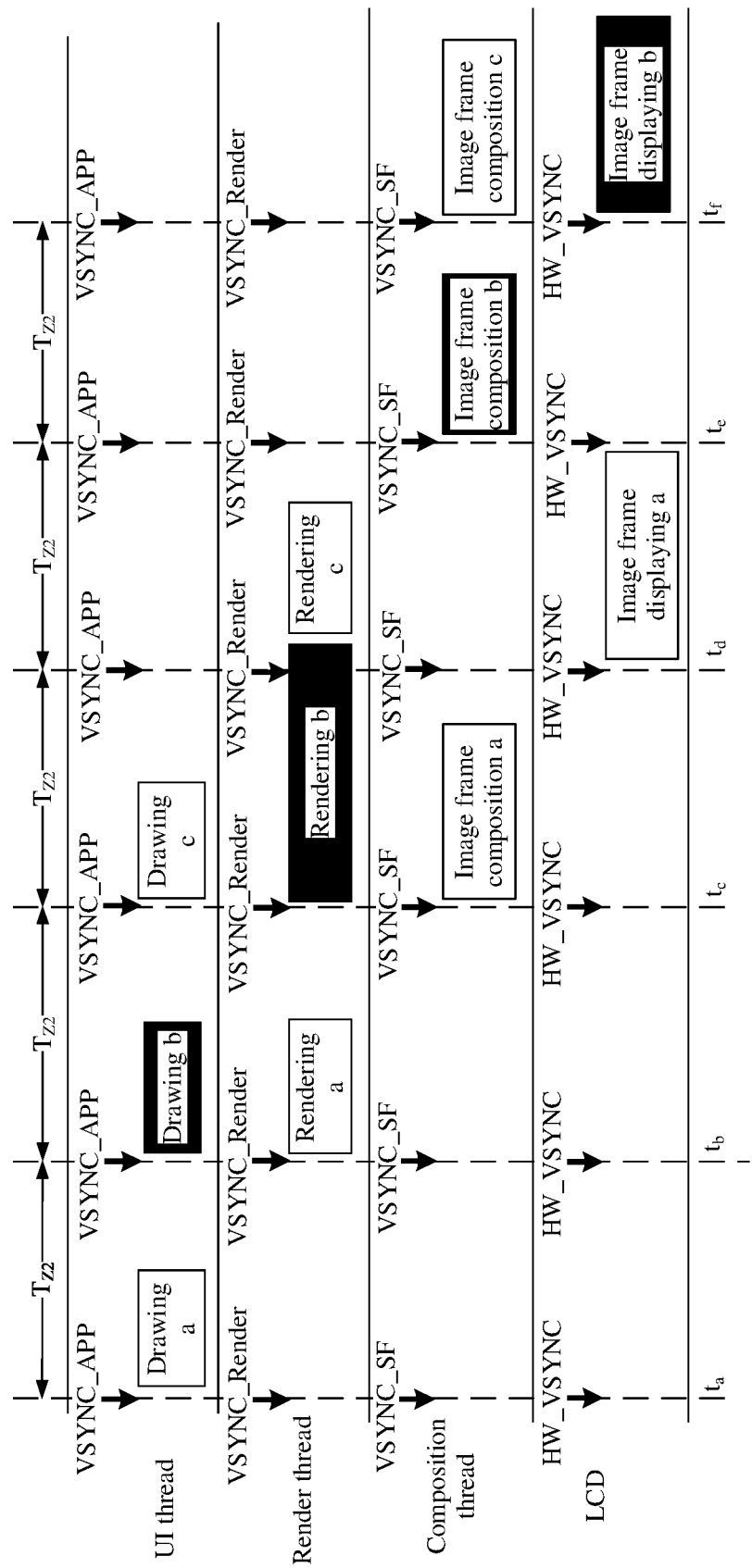
FIG. 13 is another schematic diagram of a principle of layer drawing, rendering, and composition, and image frame displaying performed by an electronic device according to an embodiment of this application.

For example, as shown in FIG. 13, the electronic device performs S701 in which in response to a VSYNC_APP signal at a moment $t_a$, a UI thread may perform "drawing a" to draw a layer a; the electronic device performs S702 in which in response to a VSYNC_Render signal at a moment $t_b$, the render thread may perform "rendering a" to render the layer a; the electronic device performs S703 in which in response to a VSYNC_SF signal at a moment $t_c$, a composition thread may perform "image frame composition a" to render the layer a; and the electronic device performs S704 in which in response to an HW_VSYNC signal at a moment $t_d$, an LCD may perform "image frame displaying a" to refresh and display an image frame a.

As shown in FIG. 13, the electronic device performs S701 in which in response to a VSYNC_APP signal at the moment $t_b$, the UI thread may perform "drawing b" to draw a layer b; and the electronic device performs S702 in which in response to a VSYNC_Render signal at the moment $t_c$, the render thread may perform "rendering b" to render the layer b. As shown in FIG. 13, because duration required for the "rendering b" is relatively large, the render thread cannot complete the rendering of the layer b within one synchronization period $T_{Z2}$ from the moment $t_c$ to the moment $t_d$, in other words, the render thread cannot complete the "rendering b" beyond the moment $t_d$. Therefore, the composition thread of the electronic device cannot perform "image frame composition b" in response to a VSYNC_SF signal at the moment $t_d$ to obtain an image frame b, and can only wait for a VSYNC_SF signal at a moment $t_e$ to arrive. The electronic device performs S703 in which in response to a VSYNC_SF signal at the moment $t_e$, the composition thread of the electronic device performs the "image frame composition b". The electronic device performs S704 in which in response to an HW_VSYNC signal at a moment $t_f$, the LCD of the electronic device performs "image frame displaying b" to refresh and display an image frame b. It can be learned from FIG. 13 that, in one synchronization period from the moment $t_e$ to the moment $t_f$, a frame loss occurs when an image is displayed on the display, in other words, a frame of blank image is displayed on the display.

To reduce the possibility that a frame loss occurs when an image is displayed on the display of the electronic device shown in FIG. 13, the electronic device may adjust the VSYNC_Render signal, so that the VSYNC_APP signal is advanced by second delay duration compared with the VSYNC_Render signal. In this way, a possibility that the render thread completes a layer rendering task within one synchronization period can be increased. Therefore, the possibility that a frame loss occurs when the electronic device displays an image can be decreased, and smoothness of displaying an image on the display can be ensured.

Figure 14:
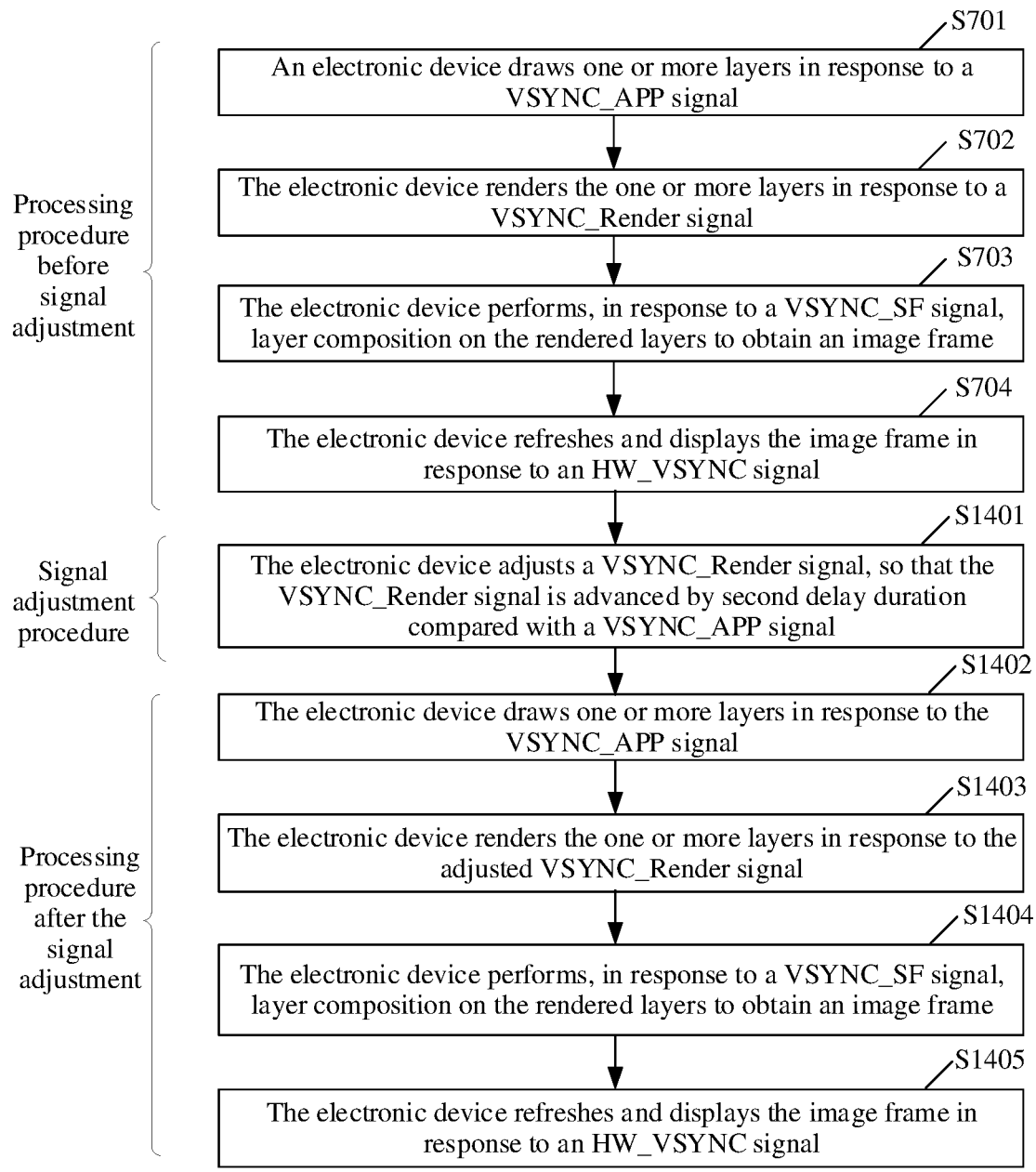
FIG. 14 is another flowchart of an image processing method based on a vertical synchronization signal according to an embodiment of this application.

Specifically, as shown in FIG. 14, the method in this embodiment of this application may include a "processing procedure before signal adjustment", a "signal adjustment procedure", and a "processing procedure after the signal adjustment". As shown in FIG. 14, the "processing procedure before signal adjustment" may include S701 to S704, the "signal adjustment procedure" may include S1401, and the "processing procedure after the signal adjustment" may include S1402 to S1405.

S1401: The electronic device adjusts a VSYNC_Render signal, so that the VSYNC_Render signal is advanced by second delay duration compared with a VSYNC_APP signal.

For a specific value of the second delay duration, refer to the detailed description in Embodiment (6) of this application. Details are not described herein again in this embodiment of this application.

Figure 15:
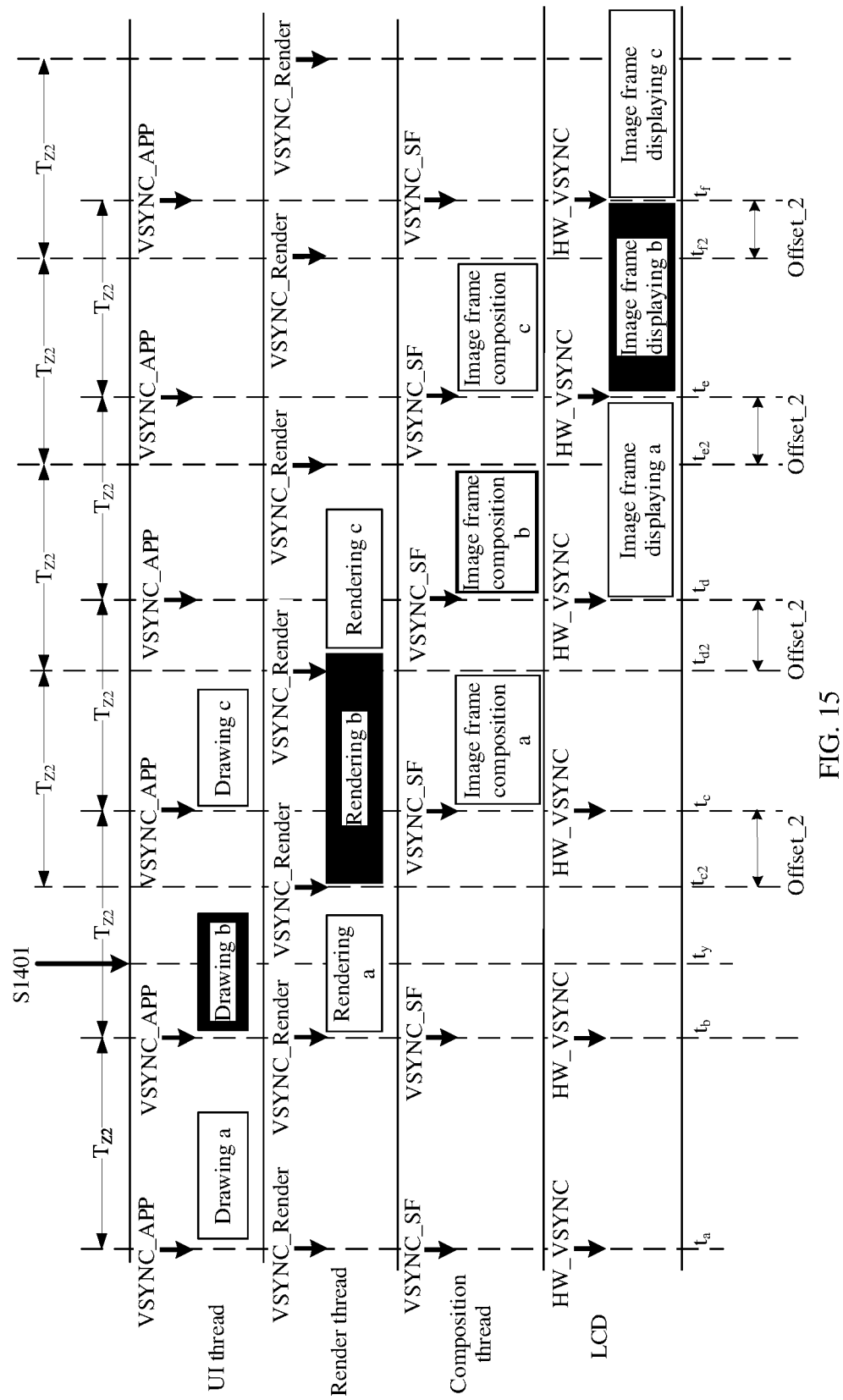
FIG. 15 is another schematic diagram of a principle of layer drawing, rendering, and composition, and image frame displaying performed by an electronic device according to an embodiment of this application.

With reference to FIG. 13, as shown in FIG. 15, it is assumed that the electronic device performs S1401 at a moment $t_y$. In this case, after the moment $t_y$ shown in FIG. 15, a VSYNC_Render signal is advanced by second delay duration Offset_2 relative to a VSYNC_APP signal. However, before the moment $t_y$, a delay time between a VSYNC_Render signal and a VSYNC_APP signal is zero.

For example, as shown in FIG. 15, at a moment $t_a$ and a moment $t_b$ before the moment $t_y$, a VSYNC_Render signal, a VSYNC_APP signal, a VSYNC_SF signal, and an HW_VSYNC signal arrive at the same time.

As shown in FIG. 15, at a moment $t_c$ after the moment $t_y$, a VSYNC_APP signal, a VSYNC_SF signal, and an HW_VSYNC signal arrive at the same time, but a VSYNC_Render signal arrives at a moment $t_{c2}$ before the moment $t_c$, where the moment $t_c$ lags behind the moment $t_{c2}$ by Offset_2; at a moment $t_d$ after the moment $t_y$, a VSYNC_APP signal, a VSYNC_SF signal, and an HW_VSYNC signal arrive at the same time, but a VSYNC_Render signal arrives at a moment $t_{d2}$ before the moment $t_d$, where the moment $t_d$ lags behind the moment $t_{d2}$ by Offset_2; at a moment $t_e$ after the moment $t_y$, a VSYNC_APP signal, a VSYNC_SF signal, and an HW_VSYNC signal arrive at the same time, but a VSYNC_Render signal arrives at a moment $t_{e2}$ before the moment $t_e$, where the moment $t_e$ lags behind the moment $t_{e2}$ by Offset_2; and at a moment $t_f$ after the moment $t_y$, a VSYNC_APP signal, a VSYNC_SF signal, and an HW_VSYNC signal arrive at the same time, but a VSYNC_Render signal arrives at a moment $t_{f2}$ before the moment $t_f$, where the moment $t_f$ lags behind the moment $t_{f2}$ by Offset_2.

It should be noted that, that the VSYNC_Render signal is advanced by the second delay duration compared with the VSYNC_APP signal may be understood as that the VSYNC_Render signal is advanced by the second delay duration compared with the HW_VSYNC signal. Therefore, the electronic device may adjust the VSYNC_Render signal based on the HW_VSYNC signal (namely, a hardware signal), so that the VSYNC_Render signal is advanced by the second delay duration compared with the HW_VSYNC signal.

It should be noted that after the VSYNC_Render signal is adjusted so that the VSYNC_Render signal is advanced by the second delay duration compared with the VSYNC_APP signal, a phase difference exists between the VSYNC_Render signal and the VSYNC_APP signal. After the VSYNC_Render signal is adjusted so that a phase difference exists between the VSYNC_Render signal and the VSYNC_APP signal, the VSYNC_APP signal has a specific delay time (such as the second delay duration) relative to the VSYN- C_Render signal. The VSYNC_Render signal is adjusted, so that a phase difference exists between the VSYNC_Render signal and the VSYNC_APP signal. After the phase difference is converted into duration, it may represent that the VSYNC_Render signal is advanced by the second delay duration.

S1402: The electronic device draws one or more layers in response to a VSYNC_APP signal.

S1403: The electronic device renders the one or more layers in response to the adjusted VSYNC_Render signal.

S1404: The electronic device performs, in response to a VSYNC_SF signal, layer composition on the rendered layers to obtain an image frame.

S1405: The electronic device refreshes and displays an image frame in response to an HW_VSYNC signal.

For example, as shown in FIG. 15, the electronic device performs S1402 in which the UI thread of the electronic device performs "drawing b" to draw a layer b in response to the VSYNC_APP signal at the moment $t_b$; the render thread of the electronic device performs "rendering b" to render a layer b in response to the VSYNC_Render signal at the moment $t_{c2}$; the composition thread of the electronic device performs "image frame composition b" in response to the VSYNC_SF signal at the moment $t_d$ to obtain an image frame b; and the LCD of the electronic device performs "image frame displaying b" in response to the HW_VSYNC signal at the moment $t_e$ to refresh and display the image frame b. Details of manners in which the electronic device performs "drawing c", "rendering c", "image frame composition c", and "image frame displaying c" shown in FIG. 15 are not described herein in this embodiment of this application.

It may be understood that, after the electronic device performs S1401, the VSYNC_Render signal is advanced by the first delay duration Offset_2 relative to the VSYNC_APP signal. For example, the VSYNC_Render signal at the moment $t_{c2}$ is advanced by Offset_2 compared with the VSYNC_APP signal at the moment $t_c$. In this way, after the UI thread performs the "drawing b" at the moment $t_b$, the render thread may perform the "rendering b" in response to the VSYNC_Render signal at the moment $t_{c2}$. In this way, before the VSYNC_SF signal at the moment $t_d$ arrives, the render thread may have more time (such as a time period from the moment $t_{c2}$ to the moment $t_d$) to perform the "rendering b". Duration of the time period from the moment $t_{c2}$ to the moment $t_d$ is $T_{Z2}$+Offset_2. In this way, the render thread may have enough time to complete the "rendering b" before the VSYNC_SF signal at the moment $t_d$ arrives. Therefore, as shown in FIG. 15, a frame loss does not occur when an image is displayed on the display of the electronic device. It can be learned that, according to the method in this embodiment, the possibility that a frame loss occurs when the electronic device displays an image can be decreased, and smoothness of displaying an image on the display can be ensured.

Embodiment (6)

In this embodiment, a condition in which the electronic device performs S1401 to S1405 in Embodiment (5) is described herein. Specifically, if a second drawing frame length of a second statistics collecting period is less than preset single-frame duration, and second rendering duration of the second statistics collecting period is greater than the preset single-frame duration, the electronic device may perform S1401 to S1405.

For example, the electronic device may periodically collect statistics on a second drawing frame length and second rendering duration within each statistics collecting period. The second statistics collecting period is a statistics collecting period previous to a current moment. The second drawing frame length is duration required by the electronic device to perform layer drawing. The second rendering duration is duration required by the electronic device to perform layer rendering.

For a method for obtaining, by the electronic device, the second drawing frame length of the second statistics collecting period, refer to the detailed description in Embodiment (4). Details are not described herein again. A method for obtaining, by the electronic device, the second rendering frame length of the second statistics collecting period may include: The electronic device may obtain one or more third rendering frame lengths of the second statistics collecting period; and determine the second rendering frame length based on the one or more third rendering frame lengths. When the one or more third rendering frame lengths include only one third rendering frame length, the third rendering frame length is equal to the third rendering frame length. When the one or more third rendering frame lengths include a plurality of third rendering frame lengths, the second rendering frame length is an average value of the plurality of third rendering frame lengths or a greatest third rendering frame length in the plurality of third rendering frame lengths.

It may be understood that, if the second rendering duration of the second statistics collecting period is greater than the preset single-frame duration, it indicates that the electronic device cannot complete layer rendering within one synchronization period in the second statistics collecting period. In this case, in a next statistics collecting period (namely, a statistics collecting period in which the current moment is located) of the second statistics collecting period, a possibility that the electronic device completes layer rendering within one synchronization period is relatively low, and a possibility that a frame loss occurs when the electronic device displays an image is relatively high.

In addition, if the second drawing frame length of the second statistics collecting period is less than the preset single-frame duration, it indicates that the electronic device can complete layer drawing within one synchronization period in the second statistics collecting period. Therefore, when the second drawing frame length of the second statistics collecting period is less than the preset single-frame duration, and the second rendering duration of the second statistics collecting period is greater than the preset single-frame duration, the electronic device performs S1101 to S1105, and on a premise that a possibility that the electronic device can complete layer drawing within one synchronization period is relatively high, a possibility that the electronic device completes rendering within one synchronization period can be increased. Therefore, the possibility that a frame loss occurs when the electronic device displays an image can be decreased, and smoothness of displaying an image on the display can be ensured.

In this embodiment of this application, a value of the second delay duration in Embodiment (5) is described herein.

In an implementation, the second delay duration Offset_2 is second preset duration. The second preset duration may be preset in the electronic device. Alternatively, the second preset duration may be set by a user in the electronic device. For example, the second preset duration may be any duration such as 2.5 ms, 3 ms, 3.6 ms, or 4 ms.

In another implementation, the second delay duration is greater than or equal to a difference between the preset single-frame duration and the second drawing frame length. In other words, the electronic device may determine the second delay duration based on the second drawing frame length and the preset single-frame duration.

For example, it is assumed that the preset single-frame frame length is 16.66 ms, and the second drawing frame length is 14 ms. Then, the second delay duration may be greater than or equal to a difference of 2.66 ms between the preset single-frame duration 16.66 ms and the second drawing frame length 14 ms. For example, the first delay duration may be any duration such as 2.7 ms, 3 ms, 4 ms, or 5 ms.

Embodiment (7)

In this embodiment, after S701 to S704, if a second drawing frame length of a second statistics collecting period is greater than preset single-frame duration, an electronic device may perform S1101 to S1105 described in Embodiment (3) or Embodiment (4). If the second drawing frame length of the second statistics collecting period is less than the preset single-frame duration, and second rendering duration of the second statistics collecting period is greater than the preset single-frame duration, the electronic device may perform S1401 to S1405 described in Embodiment (5) or Embodiment (6).

Embodiment (8)

Figure 16:
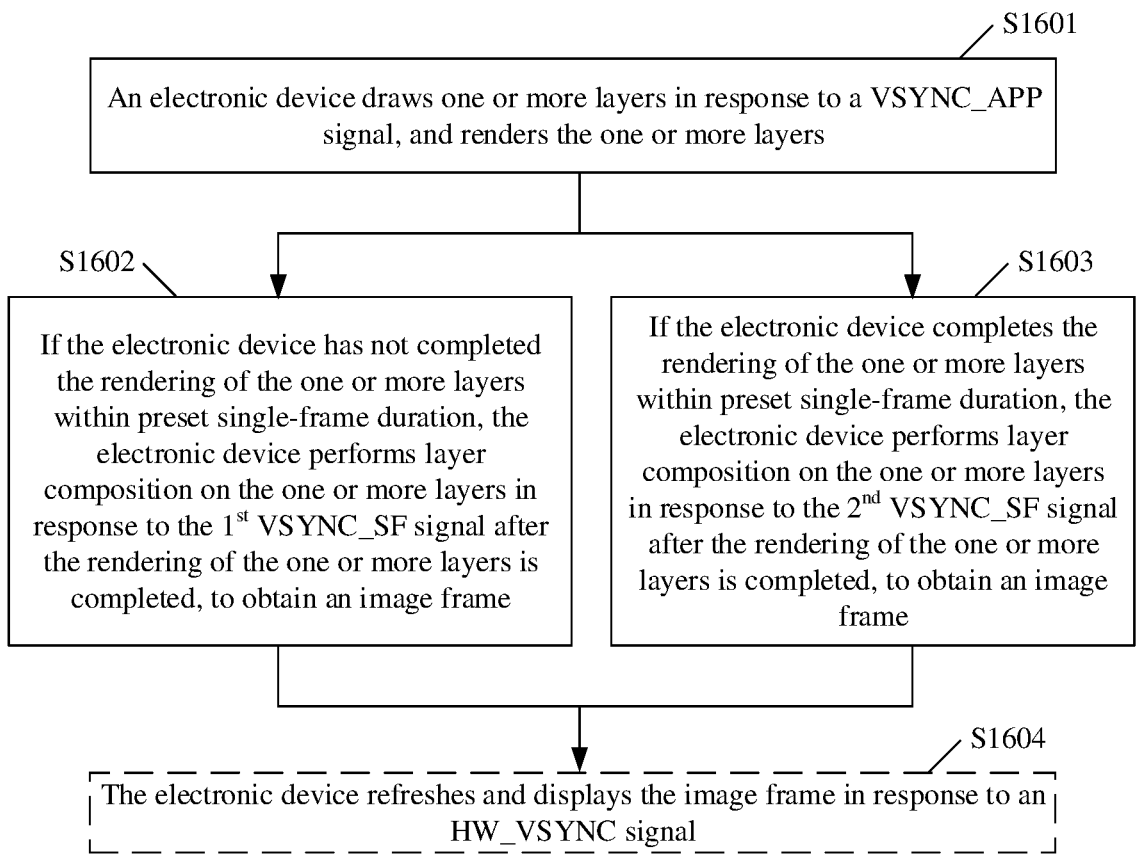
FIG. 16 is another flowchart of an image processing method based on a vertical synchronization signal according to an embodiment of this application.

This embodiment of this application provides an image processing method based on a vertical synchronization signal. The method may be applied to an electronic device including a display. Different from the method provided in the foregoing embodiment, the electronic device does not need to add one stage of pipeline for a render thread of the electronic device. In this embodiment, a vertical synchronization signal 1 (such as a VSYNC_APP signal) is a first vertical synchronization signal, and a vertical synchronization signal 2 (such as a VSYNC_SF signal) is a second vertical synchronization signal. Specifically, as shown in FIG. 16, the image processing method based on a vertical synchronization signal may include S1601 to S1604.

S1601: The electronic device draws one or more layers in response to a VSYNC_APP signal, and renders the one or more layers.

S1602: If the electronic device has not completed the rendering of the one or more layers within preset single-frame duration, the electronic device performs layer composition on the one or more layers in response to the $1^{st}$ VSYNC_SF signal after the rendering of the one or more layers is completed, to obtain an image frame.

In this embodiment, the preset single-frame duration may be equal to a signal period of a VSYNC_APP signal, a VSYNC_SF signal, or an HW_VSYNC signal, namely, the foregoing synchronization period $T_{Z2}$.

S1603: If the electronic device completes the rendering of the one or more layers within the preset single-frame duration, the electronic device performs layer composition on the one or more layers in response to the $2^{nd}$ VSYNC_SF signal after the rendering of the one or more layers is completed, to obtain an image frame.

After S1602 or S1603, the method in this embodiment of this application may further include S1604.

S1604: The electronic device refreshes and displays the image frame in response to an HW_VSYNC signal.

In a conventional technology, after rendering a layer, a render thread may immediately send the rendered layer to a GPU for a composition thread to process. In this way, when a next VSYNC_SF signal arrives, the composition thread may perform layer composition on the rendered layer. In other words, regardless of whether a UI thread and the render thread of the electronic device can complete "drawing" and "rendering" within one frame, the electronic device may perform layer composition on the layer in response to the $1^{st}$ VSYNC_SF signal after the rendering of the layer is completed, to obtain the image frame.

For example, as shown in FIG. 6, the render thread completes "rendering 1" before a moment $t_b$, and may send a layer 1 to the GPU for the composition thread to process. After a VSYNC_SF signal at the moment $t_b$ arrives, the composition thread may perform "image frame composition 1". For another example, as shown in FIG. 6, the render thread completes "rendering 2" after a moment $t_c$, and may send a layer 2 to the GPU for the composition thread to process. After the VSYNC_SF signal at the moment $t_d$ arrives, the composition thread may perform "image frame composition 2".

However, in this embodiment, for a case in which drawing and rendering are completed within one frame (in other words, the electronic device completes rendering of a layer within the preset single-frame duration), and a case in which drawing and rendering are not completed within one frame (that is, the electronic device has not completed the rendering of the layer within the preset single-frame duration), the electronic device may perform different processing.

Figure 17:
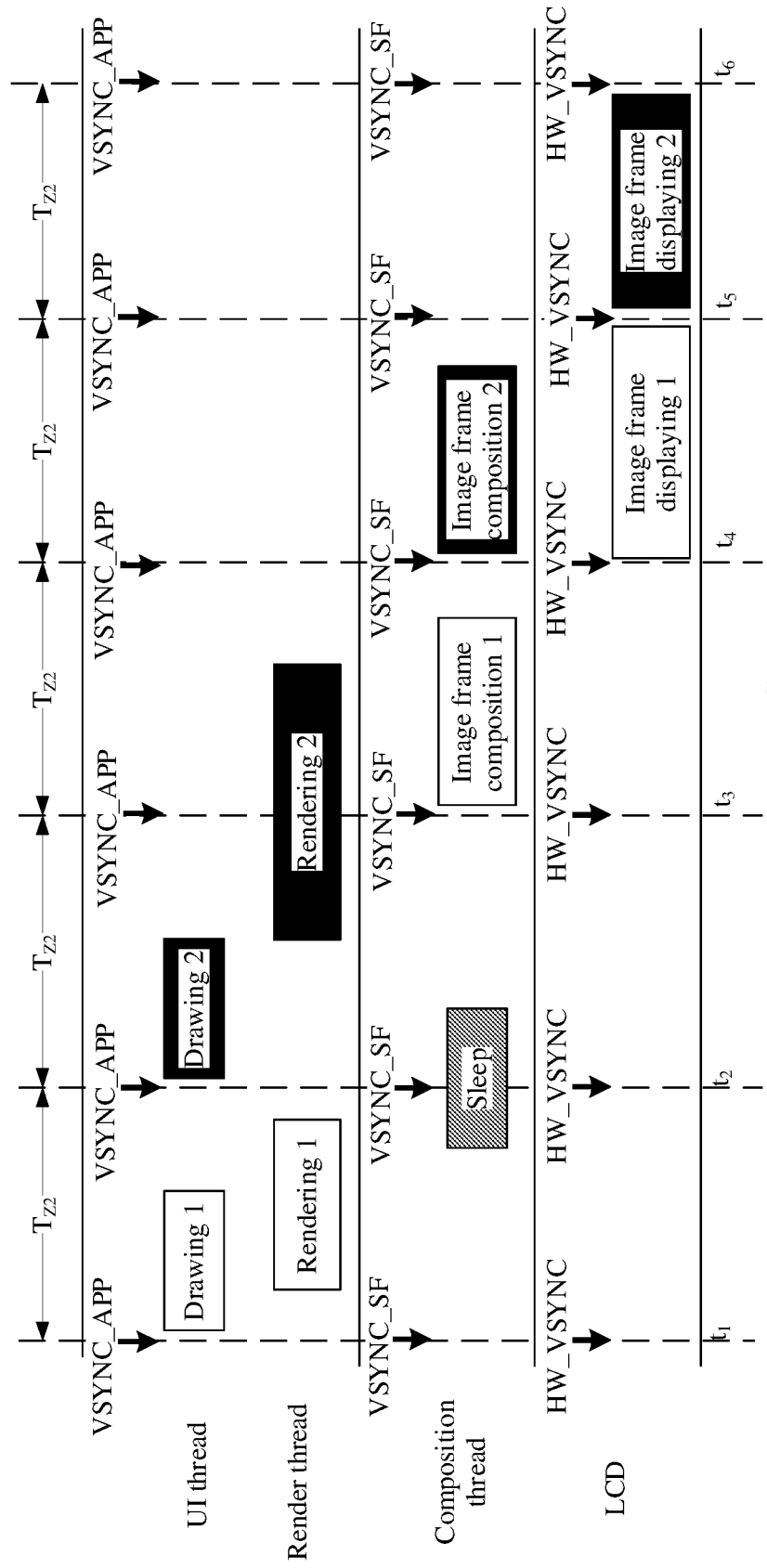
FIG. 17 is another schematic diagram of a principle of layer drawing, rendering, and composition, and image frame displaying performed by an electronic device according to an embodiment of this application.

For example, as shown in FIG. 17, the electronic device performs S1601 in which the UI thread of the electronic device performs "drawing 1" to draw a layer 1 in response to a VSYNC_APP signal at a moment $t_1$, and then the render thread performs "rendering 1" to render the layer 1. The render thread of the electronic device completes the "rendering 1" before a moment $t_2$ shown in FIG. 17. To be specific, the render thread completes rendering of the layer 1 within one synchronization period $T_{Z2}$ from the moment $t_1$ to the moment $t_2$, in other words, the electronic device completes the rendering of the layer 1 within preset single-frame duration (such as $T_{Z2}$). Therefore, the electronic device may perform S1603 in which in response to the $2^{nd}$ VSYNC_SF signal after the render thread renders the layer 1, the composition thread of the electronic device performs "image frame composition 1" on the layer 1 to obtain an image frame 1. The render thread completes the rendering of the layer 1 after the moment $t_1$ and before the moment $t_2$. Therefore, the VSYNC_SF signal at the moment $t_2$ is the $1^{st}$ VSYNC_SF signal after the render thread completes the rendering of the layer 1, and a VSYNC_SF signal at a moment $t_3$ is the $2^{nd}$ VSYNC_SF signal after the render thread completes the rendering of the layer 1. It can be learned that, as shown in FIG. 17, the composition thread of the electronic device may perform the "image frame composition 1" on the layer 1 in response to the VSYNC_SF signal at the moment $t_3$ to obtain the image frame 1. Then, the electronic device may perform S1604 in which an LCD of the electronic device may perform, in response to an HW_VSYNC signal at a moment $t_4$, "image frame displaying 1" to refresh and display the image frame 1.

For another example, as shown in FIG. 17, the electronic device performs S1601 in which the UI thread of the electronic device performs "drawing 2" to draw a layer 2 in response to a VSYNC_APP signal at a moment $t_2$, and then the render thread performs "rendering 2" to render the layer 2. The render thread of the electronic device has not completed the "rendering 2" before the moment $t_3$ shown in FIG. 17. To be specific, the render thread has not completed rendering of the layer 2 within one synchronization period $T_{Z2}$ from the moment $t_2$ to the moment $t_2$, in other words, the electronic device has not completed the rendering of the layer 2 within preset single-frame duration (such as $T_{Z2}$). Therefore, the electronic device may perform S1602 in which in response to the $1^{st}$ VSYNC_SF signal after the render thread renders the layer 1, the composition thread of the electronic device performs "image frame composition 2" on the layer 2 to obtain an image frame 2. The render thread completes the rendering of the layer 2 after the moment $t_3$. Therefore, the VSYNC_SF signal at the moment $t_4$ is the $1^{st}$ VSYNC_SF signal after the render thread completes the rendering of the layer 2. It can be learned that, as shown in FIG. 17, the composition thread of the electronic device may perform the "image frame composition 2" on the layer 2 in response to the VSYNC_SF signal at the moment $t_4$ to obtain the image frame 2. Then, the electronic device may perform S1604 in which an LCD of the electronic device may perform, in response to an HW_VSYNC signal at a moment $t_5$, "image frame displaying 2" to refresh and display the image frame 2.

It should be noted that, in this embodiment of this application, that the render thread sends the rendered layer to the GPU specifically means that the render thread saves the rendered layer to an SF buffer (Buffer) queue of the GPU. The SF buffer can save the rendered layer according to a first in first out rule. In response to a VSYNC_SF signal, the composition thread may perform layer composition on a layer at a queue head of the SF buffer. The layer is dequeued from the SF buffer.

In an implementation, a method for implementing, by the electronic device, "if the electronic device completes the rendering of the one or more layers within the preset single-frame duration, the electronic device performs layer composition on the one or more layers in response to the $2^{nd}$ VSYNC_SF signal after the rendering of the one or more layers is completed, to obtain an image frame" in S1603 may include: If the electronic device completes the rendering of the one or more layers within the preset single-frame duration, the render thread of the electronic device may save the rendered one or more layers to the SF buffer in response to the $1^{st}$ VSYNC_SF signal after the rendering of the one or more layers is completed. Then, in response to the $2^{nd}$ VSYNC_SF signal after the rendering of the one or more layers is completed, the composition thread of the electronic device performs layer composition on the one or more layers to obtain the image frame.

In other words, if drawing and rendering are completed within one frame (in other words, the electronic device completes rendering of a layer within the preset single-frame duration), the render thread does not immediately save the rendered layer to the SF buffer, but enters a sleep state (a sleep state shown in FIG. 17). In response to the $1^{st}$ VSYNC_SF signal after the one or more layers are rendered, the rendered layer is sent to and saved to the SF buffer. Therefore, at a same moment (namely, a moment at which the $1^{st}$ VSYNC_SF signal after the rendering of the one or more layers is completed arrives), if the layer is not saved to the SF buffer, the composition thread cannot perform layer composition on the layer.

In another implementation, a method for implementing, by the electronic device, "if the electronic device completes the rendering of the one or more layers within the preset single-frame duration, the electronic device performs layer composition on the one or more layers in response to the $2^{nd}$ VSYNC_SF signal after the rendering of the one or more layers is completed, to obtain an image frame" in S1603 may include: If the electronic device completes the rendering of the one or more layers within the preset single-frame duration, the render thread of the electronic device may immediately save the one or more layers to the SF buffer. However, in response to the $1^{st}$ VSYNC_SF signal after the render thread completes the rendering of the one or more layers, the composition thread of the electronic device does not perform layer composition on the one or more layers. In response to only the $2^{nd}$ VSYNC_SF signal after the rendering of the one or more layers is completed, the composition thread of the electronic device performs layer composition on the one or more layers to obtain the image frame.

According to solutions in this embodiment, for a layer on which drawing and rendering are completed within one frame, the electronic device may perform layer composition on the layer one frame later. In this way, an image frame corresponding to the layer may be displayed one frame later. In this way, even if there is subsequently a case in which the electronic device cannot complete drawing and rendering within one frame, a buffer time of one frame (namely, one synchronization period $T_{Z2}$) may be reserved, so that a possibility that a frame loss occurs when the electronic device displays an image can be decreased, and smoothness of displaying an image on the display can be ensured.

It should be noted that for a specific scenario or condition in which the electronic device performs the method in this embodiment (for example, performs S1601 to S1604) to perform layer drawing, rendering, and composition, and image frame displaying, refer to the scenario or condition described in Embodiment (2). Details are not described herein in this embodiment of this application.

Embodiment (9)

In this embodiment, a specific method for determining, by an electronic device, that rendering of one or more layers is completed in any embodiment of this application is described.

In a first application scenario, the one or more layers may be one layer. In a second application scenario, the one or more first layers may include a plurality of layers. In different application scenarios, manners in which the electronic device determines that the rendering of the one or more layers is completed are different.

In the first application scenario, that the rendering of the one or more layers is completed means that the rendering of the layer is completed.

In the second application scenario, that the rendering of the one or more layers is completed means that rendering of a preset layer in the plurality of layers is completed; or rendering of all of the plurality of layers is completed. For example, the preset layer may include a layer that is in the plurality of layers and for which a ratio of a layer area to an area of a display is greater than a preset proportion threshold.

Embodiment (10)

Figure 18:
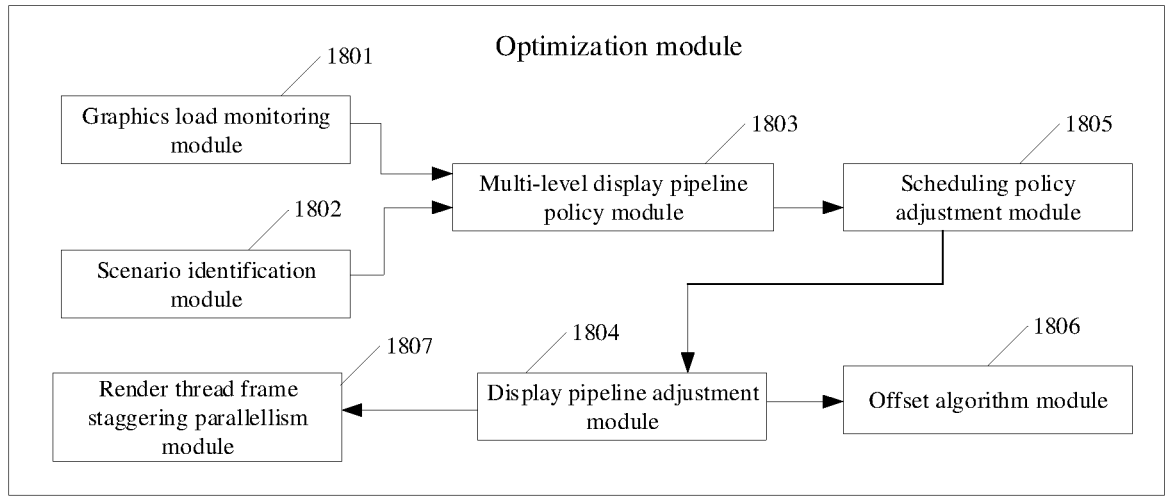
FIG. 18 is a schematic structural composition diagram of an electronic device according to an embodiment of this application.

FIG. 18 is a schematic diagram of an optimization module according to an embodiment of this application. The optimization module may be a functional module that is in an image processing apparatus based on a vertical synchronization signal or an electronic device and that is configured to implement the method in embodiments of this application. As shown in FIG. 18, the optimization module may include: a graphics load detection module 1801, a scenario identification module 1802, a multi-level display pipeline policy module 1803, a display pipeline adjustment module 1804, a scheduling policy adjustment module 1805, an offset algorithm module 1806, and a render thread frame staggering parallelism module 1807.

The graphics load detection module 1801 is configured to monitor and collect statistics on a drawing frame length required by a UI thread to draw each frame of layer (namely, duration required for drawing each frame of layer) and a rendering frame length required by the render thread to render each frame of layer (namely, duration required for rendering each frame of layer), as an input of a multi-level display pipeline policy. For example, the graphics load detection module 1801 is configured to support the electronic device in performing an operation of "collecting statistics on a first processing frame length of a first statistics collecting period" in S901, and S901a and S901b in the foregoing method embodiments, and/or is configured to perform another process of the technology described in this specification.

The scenario identification module 1802 is configured to identify a scenario type of the electronic device (such as a scenario type of a foreground application). For example, the scenario identification module 1802 is configured to support the electronic device in performing operations of "identifying whether the electronic device is in a high frame rate scenario" and "identifying whether a foreground application of the electronic device is a preset application" in the foregoing method embodiments, and/or is configured to perform another process of the technology described in this specification.

The multi-level display pipeline policy module 1803 is configured to determine whether to take effect a policy used by the electronic device to draw, render, and compose a layer, and display an image frame, and whether to guide the scheduling policy adjustment module 1805 to adjust the policy. For example, based on a detection result or a statistics collecting result of the graphics load detection module 1801 and an identification result of the scenario identification module 1802, the multi-level display pipeline policy module 1803 may determine whether to take effect the policy used by the electronic device to draw, render, and compose a layer, and display an image frame, and whether to guide the scheduling policy adjustment module 1805 to adjust the policy. For example, the multi-level display pipeline policy module 1803 is configured to support the electronic device in performing S901 in the foregoing method embodiments, and/or is configured to perform another process of the technology described in this specification.

The scheduling policy adjustment module 1805 is configured to adjust, based on a decision of the multi-level display pipeline policy module 1803, the policy used by the electronic device to draw, render, and compose a layer, and display an image frame. For example, the scheduling policy adjustment module 1805 may adjust the policy used by the electronic device to draw, render, and compose a layer, and display an image frame, so that the electronic device performs S701 to S704, or S701', S703, and S704, or S1101 to S1105, or S1401 to S1405, or S1601 to S1604.

The display pipeline adjustment module 1804 is a unified enabling interface provided in this embodiment of this application. The scheduling policy adjustment module 1805 may communicate with modules such as a render thread, the offset algorithm module 1806, and the render thread frame staggering parallelism module 1807 by using the display pipeline adjustment module 1804.

The offset algorithm module 1806 is configured to adjust an offset of a VSYNC_Render signal. For example, the offset algorithm module 1806 is configured to support the electronic device in performing operations of "obtaining a first delay time" and "obtaining a second delay time" in the foregoing method embodiments, and/or is configured to perform another process of the technology described in this specification. The offset algorithm module 1806 is further configured to support the electronic device in performing S1101 and S1401 in the foregoing method embodiments, and/or is configured to perform another process of the technology described in this specification.

The render thread frame staggering parallelism module 1807 may be the foregoing render thread. For example, the render thread frame staggering parallelism module 1807 is configured to support the electronic device in performing operations of "rendering a layer" in S702 and S701' and operations of "rendering a layer" in S1103, S1403, and S1601 in the foregoing method embodiments, and/or is configured to perform another process of the technology described in this specification. The optimization module may be implemented in the UI framework 30 shown in FIG. 3.

Certainly, the electronic device may further include a UI thread parallelism module, a composition thread parallelism module, and a display module. For example, the UI thread parallelism module is configured to support the electronic device in performing operations of "drawing a layer" in S701 and S701' and operations of "drawing a layer" in S1102, S1402, and S1601 in the foregoing method embodiments, and/or is configured to perform another process of the technology described in this specification. The composition thread parallelism module is configured to support the electronic device in performing S703, S1104, S1404, S1602, and S1603 in the foregoing method embodiments, and/or is configured to perform another process of the technology described in this specification. The display module is configured to support the electronic device in performing S704, S1105, S1405, and S1604 in the foregoing method embodiments, and/or is configured to perform another process of the technology described in this specification.

Embodiment (11)

Some embodiments of this application provide an electronic device. The electronic device may include a display (such as a touchscreen), a memory, and one or more processors. The display, the memory, and the processor are coupled. The memory is configured to store computer program code, and the computer program code includes computer instructions. When the processor executes the computer instructions, the electronic device may perform functions or steps performed by the electronic device in the foregoing method embodiments. For a structure of the electronic device, refer to the structure of the electronic device 100 shown in FIG. 1.

Figure 19:
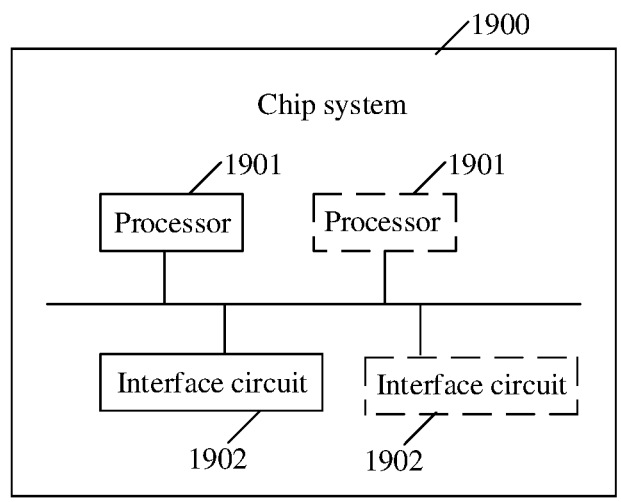
FIG. 19 is a schematic structural composition diagram of a chip system according to an embodiment of this application.

An embodiment of this application further provides a chip system. As shown in FIG. 19, the chip system 1900 includes at least one processor 1901 and at least one interface circuit 1902. The processor 1901 and the interface circuit 1902 may be interconnected by using a line. For example, the interface circuit 1902 may be configured to receive a signal from another apparatus (for example, a memory of an electronic device). For another example, the interface circuit 1902 may be configured to send a signal to another apparatus (for example, the processor 1901 or a touchscreen of the electronic device). For example, the interface circuit 1902 may read instructions stored in the memory, and send the instructions to the processor 1901. When the instructions are executed by the processor 1901, the electronic device may be enabled to perform the steps in the foregoing embodiments. Certainly, the chip system may further include another discrete device. This is not specifically limited in this embodiment of this application.

An embodiment of this application further provides a computer storage medium. The computer storage medium includes computer instructions. When the computer instructions run on the foregoing electronic device, the electronic device is enabled to perform functions or steps performed by the electronic device in the foregoing method embodiments.

An embodiment of this application further provides a computer program product. When the computer program product runs on a computer, the computer is enabled to perform functions or steps performed by an electronic device in the foregoing method embodiments.

The foregoing descriptions about implementations allow a person skilled in the art to clearly understand that, for the purpose of convenient and brief description, division of the foregoing functional modules is used as an example for illustration. In actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may be one or more physical units, that is, may be located in one place, or may be distributed in a plurality of different places. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of steps of methods in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An image processing method, comprising:
    drawing, by an electronic device and during a first synchronization period spanning a moment $t_a$ to a moment $t_b$, one or more layers in response to a first vertical synchronization signal triggered at the moment $t_a$;
    after completion of the drawing, triggering, by the electronic device, a second vertical synchronization signal at the moment $t_b$ or after the moment $t_b$ that is a different vertical synchronization signal than the first vertical synchronization signal; and
    in response to the triggering of the second vertical synchronization signal at the moment $t_b$ or after the moment $t_b$, rendering, by the electronic device and during a second synchronization period spanning the moment $t_b$ to a moment $t_c$, the one or more layers.

2. The method according to claim 1, wherein the rendering, by the electronic device and during the second synchronization period spanning the moment $t_b$ to the moment $t_c$, the one or more layers in response to the triggering of the second vertical synchronization signal at the moment $t_b$ or after the moment $t_b$ comprises:
    rendering, by the electronic device and during the second synchronization period spanning the moment $t_b$ to the moment $t_c$, based on the electronic device meeting at least one of the following preset conditions, the one or more layers in response to the triggering of the second vertical synchronization signal at the moment $t_b$ or after the moment $t_b$, wherein the preset conditions comprise:
    a screen refresh rate of the electronic device is greater than a preset refresh rate threshold;
    a current application of the electronic device is a preset application, and the preset application does not comprise a game application; or
    first processing duration of the electronic device in a first statistics collecting period is greater than preset single-frame duration, the first processing duration is a sum of a first drawing duration and a first rendering duration, the first drawing duration is a duration required by the electronic device to draw a layer, and the first rendering duration is a duration required by the electronic device to render a layer.

3. The method according to claim 1, wherein the second vertical synchronization signal has the same frequency as the first vertical synchronization signal.

4. The method according to claim 1, wherein the method further comprises:
    after the rendering, by the electronic device and during the second synchronization period spanning the moment $t_b$ to the moment $t_c$, the one or more layers in response to the triggering of the second vertical synchronization signal at the moment $t_b$ or after the moment $t_b$:

adjusting, by the electronic device, the triggering of the second vertical synchronization signal, wherein the triggering of the second vertical synchronization signal is delayed to trigger after the moment $t_b$ by a first delay duration compared with the first vertical synchronization signal; and in response to the triggering of the adjusted second vertical synchronization signal after the moment $t_b$, rendering, by the electronic device and during the second synchronization period, the one or more layers.

5. The method according to claim 4, wherein the adjusting, by the electronic device, the triggering of the second vertical synchronization signal, and the triggering of the second vertical synchronization signal is delayed to trigger after the moment $t_b$ by the first delay duration compared with the first vertical synchronization signal comprises:

adjusting, by the electronic device, based on a second drawing duration of a second statistics collecting period being greater than a preset single-frame duration, the triggering of the second vertical synchronization signal, and the triggering of the second vertical synchronization signal is delayed to trigger after the moment $t_b$ by the first delay duration compared with the first vertical synchronization signal;

wherein the first delay duration is greater than or equal to a difference between the second drawing duration and the preset single-frame duration.

6. The method according to claim 1, wherein the method further comprises:

adjusting, by the electronic device, a subsequent triggering of the second vertical synchronization signal, wherein a subsequent triggering of the first vertical synchronization signal is advanced by a second delay duration compared with the second vertical synchronization signal; and rendering, by the electronic device and during the second synchronization period, in response to the subsequent triggering of the adjusted second vertical synchronization signal, one or more other layers.

7. The method according to claim 6, wherein the adjusting, by the electronic device, the subsequent triggering of the second vertical synchronization signal, and the subsequent triggering of the first vertical synchronization signal is advanced by a second delay duration compared with the second vertical synchronization signal comprises:

adjusting, by the electronic device, based on second drawing duration of a second statistics collecting period being less than preset single-frame duration, and second rendering duration of the second statistics collecting period is greater than the preset single-frame duration, the subsequent triggering of the second vertical synchronization signal, wherein the first vertical synchronization signal is advanced by the second delay duration compared with the second vertical synchronization signal;

wherein the second delay duration is greater than or equal to a difference between the preset single-frame duration and the second drawing duration.

8. An image processing method, comprising:
drawing, by an electronic device, one or more layers in response to a first vertical synchronization signal;
rendering the one or more layers;
obtaining an image frame, wherein obtaining the image frame comprises:
in response to a determination, by the electronic device, that the electronic device has not completed the rendering of the one or more layers within a preset single-frame duration, performing, by the electronic device, layer composition on the one or more layers in response to a first second vertical synchronization signal after the rendering of the one or more layers is completed to obtain the image frame; or in response to a determination, by the electronic device, that the electronic device has completed the rendering of the one or more layers within a preset single-frame duration, saving, by the electronic device, the one or more layers to a buffer, and performing, by the electronic device, layer composition on the one or more layers stored in the buffer in response to a second second vertical synchronization signal after the rendering of the one or more layers is completed to obtain the image frame;
and,
displaying, by the electronic device, the obtained image frame.

9. The method according to claim 8, wherein the drawing, by the electronic device, the one or more layers in response to the first vertical synchronization signal and rendering the one or more layers comprises:

rendering, by the electronic device, based on the electronic device meeting at least one of the following conditions, the one or more layers in response to the first vertical synchronization signal;

wherein the conditions comprise:
a screen refresh rate of the electronic device is greater than a preset refresh rate threshold;
a current application of the electronic device is a preset application, wherein the preset application does not comprise a game application; or
a first processing duration of the electronic device in a first statistics collecting period is greater than a preset single-frame duration, the first processing duration is a sum of a first drawing duration and a first rendering duration, the first drawing duration is a duration required by the electronic device to draw a layer, and the first rendering duration is a duration required by the electronic device to render a layer.

10. An electronic device, comprising:
at least one processor; and
a non-transitory computer-readable storage medium storing a program to be executed by the processor, the program including instructions for:
drawing, during a first synchronization period spanning a moment $t_a$ to a moment $t_b$, one or more layers in response to a first vertical synchronization signal triggered at moment $t_a$;
after completion of the drawing, triggering a second vertical synchronization signal at the moment $t_b$ or after the moment $t_b$ that is a different vertical synchronization signal than the first vertical synchronization signal; and
in response to the triggering of the second vertical synchronization signal at the moment $t_b$ or after the moment $t_b$, rendering, during a second synchronization period spanning the moment $t_b$ to a moment $t_c$, the one or more layers in response to the second vertical synchronization signal.

11. The electronic device according to claim 10, wherein the rendering, during the second synchronization period spanning the moment $t_b$ to the moment $t_c$, the one or more layers in response to the triggering of the second vertical synchronization signal at the moment $t_b$ or after the moment $t_b$ comprises:

rendering, based on the electronic device meeting at least one of the following preset conditions, the one or more layers in response to the second vertical synchronization signal;

wherein the preset conditions comprise:
- a screen refresh rate of the electronic device is greater than a preset refresh rate threshold;
- a current application of the electronic device is a preset application, wherein the preset application does not comprise a game application; or
- a first processing duration of the electronic device in a first statistics collecting period is greater than preset single-frame duration, the first processing duration is a sum of a first drawing duration and a first rendering duration, the first drawing duration is a duration required to draw a layer, and the first rendering duration is a duration required to render a layer.

12. The electronic device according to claim 10, wherein the second vertical synchronization signal has the same frequency as the first vertical synchronization signal.

13. The electronic device according to claim 10, wherein the instructions further include instructions for:
- adjusting the triggering of the second vertical synchronization signal, wherein the triggering of the second vertical synchronization signal is delayed to trigger after the moment $t_b$ by a first delay duration compared with the first vertical synchronization signal; and
- in response to the triggering of the adjusted second vertical synchronization signal after the moment $t_b$, rendering, during the second synchronization period, the one or more layers.

14. The electronic device according to claim 13, wherein the adjusting the triggering of the second vertical synchronization signal, wherein the triggering of the second vertical synchronization signal is delayed to trigger after the moment $t_b$ by the first delay duration compared with the first vertical synchronization signal comprises:
- adjusting, based on a second drawing duration of a second statistics collecting period being greater than a preset single-frame duration, the triggering of the second vertical synchronization signal, wherein the triggering of the second vertical synchronization signal is delayed to trigger after the moment $t_b$ by the first delay duration compared with the first vertical synchronization signal;

wherein the first delay duration is greater than or equal to a difference between the second drawing duration and the preset single-frame duration.

15. The electronic device according to claim 10, wherein the instructions further include instructions for:
- adjusting a subsequent triggering of the second vertical synchronization signal, wherein the first vertical synchronization signal is advanced by second delay duration compared with the second vertical synchronization signal; and
- rendering, during the second synchronization period, one or more other layers in response to the subsequent triggering of the adjusted second vertical synchronization signal.

16. The electronic device according to claim 15, wherein the adjusting the subsequent triggering of the second vertical synchronization signal, and the subsequent triggering of the first vertical synchronization signal is advanced by a second delay duration compared with the second vertical synchronization signal comprises:
- adjusting, based on second drawing duration of a second statistics collecting period being less than preset single-frame duration, and a second rendering duration of the second statistics collecting period is greater than the preset single-frame duration, the subsequent triggering of the second vertical synchronization signal, wherein the first vertical synchronization signal is advanced by the second delay duration compared with the second vertical synchronization signal;

wherein the second delay duration is greater than or equal to a difference between the preset single-frame duration and the second drawing duration.

* * * * *